United States Patent
Takano

(10) Patent No.: US 11,711,702 B2
(45) Date of Patent: Jul. 25, 2023

(54) COMMUNICATION DEVICE, COMMUNICATION METHOD, AND RECORDING MEDIUM

(71) Applicant: Sony Corporation, Tokyo (JP)

(72) Inventor: Hiroaki Takano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 212 days.

(21) Appl. No.: 17/258,168

(22) PCT Filed: Jul. 17, 2019

(86) PCT No.: PCT/JP2019/028173
§ 371 (c)(1),
(2) Date: Jan. 6, 2021

(87) PCT Pub. No.: WO2020/031645
PCT Pub. Date: Feb. 13, 2020

(65) Prior Publication Data
US 2021/0282028 A1    Sep. 9, 2021

(30) Foreign Application Priority Data
Aug. 9, 2018 (JP) ................. 2018-150414

(51) Int. Cl.
*H04W 24/10* (2009.01)
*H04W 16/28* (2009.01)
*H04W 68/00* (2009.01)

(52) U.S. Cl.
CPC ........... *H04W 16/28* (2013.01); *H04W 24/10* (2013.01); *H04W 68/005* (2013.01)

(58) Field of Classification Search
CPC ... H04W 16/28; H04W 24/10; H04W 68/005; H04B 7/0691; H04B 7/0695
See application file for complete search history.

(56) References Cited

U.S. PATENT DOCUMENTS

2013/0182672 A1    7/2013  Kakishima et al.
2017/0048037 A1*   2/2017  Yen ....................... H04B 7/0695
2017/0366994 A1   12/2017  Akkarakaran et al.

FOREIGN PATENT DOCUMENTS

JP    2012-44316 A    3/2012

OTHER PUBLICATIONS

Huawei et al: "Beam measurement and reporting", 3GPP Draft; R1-1715467, 3rd Generation Partnership Project (3GPP), Mobile Competence Centre ; 650, Route Des Lucioles ;F-06921 Sophia-Antipolis Cedex; France, vol. RAN WG1, No. Nagoya, Japan; Sep. 18, 2017-Sep. 21, 2017 Sep. 17, 2017 (Sep. 17, 2017). p. 1-9.

(Continued)

*Primary Examiner* — Chuong A Ngo
(74) *Attorney, Agent, or Firm* — Xsensus LLP

(57) ABSTRACT

Provided is a mechanism capable of reducing a burden on a beam selection procedure on a plurality of frequency bandwidths. A communication device includes: a setting section (151) that performs setting of beam groups defined in a plurality of frequency bandwidths, respectively; and a notification section (153) that notifies a terminal device of information regarding identicalness between the beam groups defined in the frequency bandwidths different from each other.

16 Claims, 18 Drawing Sheets

(56) References Cited

OTHER PUBLICATIONS

QUALCOMM: "Summary on Beam Management Offline" 3GPP Draft;Summary of Beam MGMT Contributions, 3rd GenerationPartnership Project (GPP) Mobile Competence Centre ; 650, Route Des Lugioles ; F-06921 Sophia-Antipols Cedex ; France, vol. RAN WG1, No. Nagoya, Japan; Sep. 18, 2017-Sep. 21, 2017 Sep. 20, 2017 (Sep. 20, 2017), p. 1-31.

International Search Report and Written Opinion dated Oct. 21, 2019, received for PCT Application No. PCT/JP2019/028173, Filed on Jul. 17, 2019, 6 pages including English Translation.

Panasonic, "QCL Related issues During BWP Switching", 3GPP TSG-RAN WG1 Meeting No. 93, R1-1806390, May 21-25, 2018, pp. 1-2.

LG Electronics, "Framework for CSI Acquisition and Beam Management", 3GPP TSG RAN WG1 Meeting No. 90, R1-1713141, Aug. 21-25, 2017, pp. 1-6.

Catt, "L3 Mobility based on CSI-RS based Measurements", 3GPP TSG RAN WG1 NR Ad-Hoc#2, R1-1711576, Jun. 27-30, 2017, pp. 1-7.

\* cited by examiner

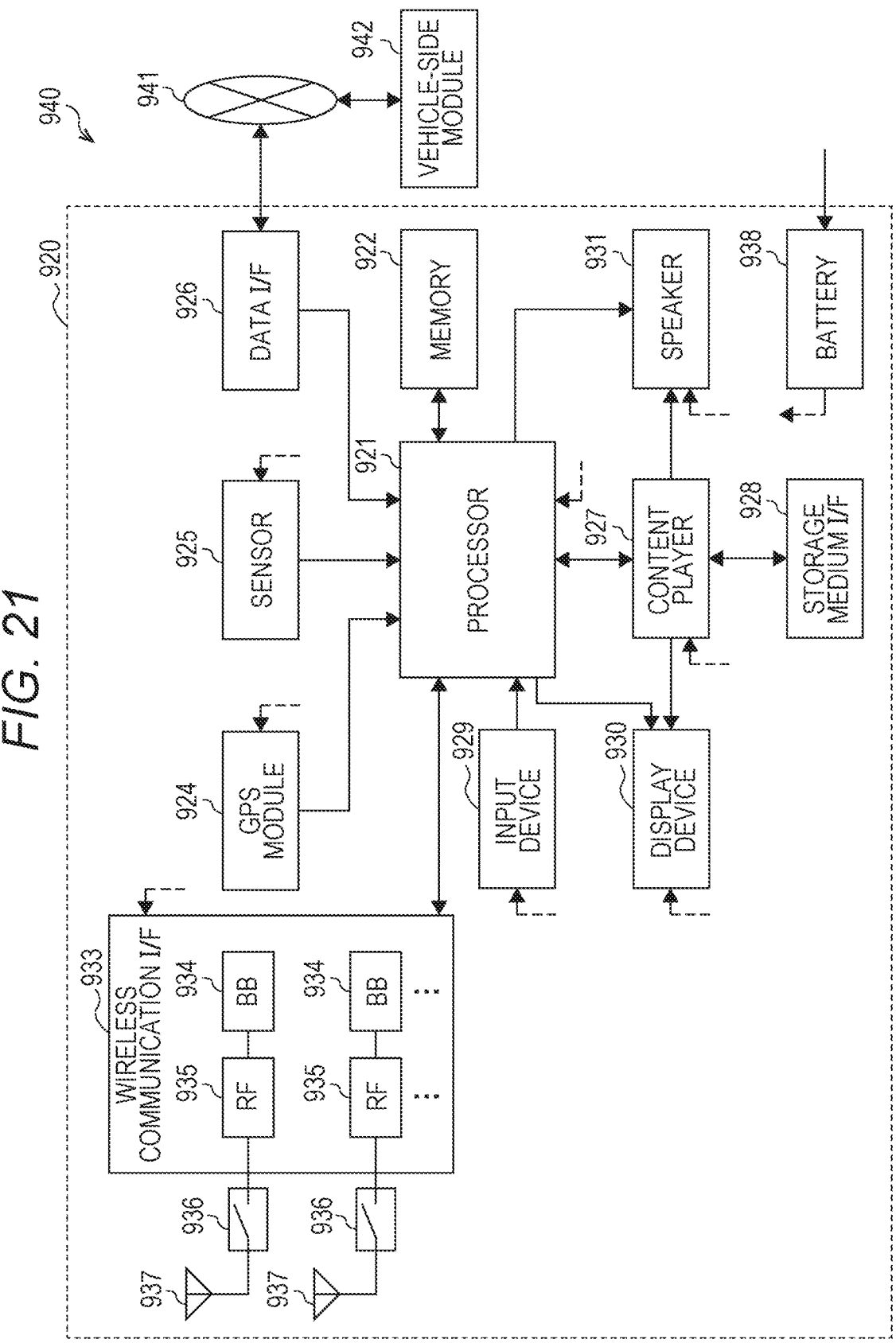

COMMUNICATION DEVICE, COMMUNICATION METHOD, AND RECORDING MEDIUM

CROSS-REFERENCE TO RELATED APPLICATIONS

The present application is based on PCT filing PCT/JP2019/028173, filed Jul. 17, 2019, which claims priority to JP 2018-150414, filed Aug. 9, 2018, the entire contents of each are incorporated herein by reference.

TECHNICAL FIELD

The present disclosure relates to a communication device, a communication method, and a recording medium.

BACKGROUND ART

A wireless access scheme and wireless network (hereinafter, also referred to as "Long Term Evolution (LTE)", "LTE-Advanced (LTE-A)", "LTE-Advanced Pro (LTE-A Pro)", "5th Generation (5G)", "New Radio (NR)", "New Radio Access Technology (NRAT)", "Evolved Universal Terrestrial Radio Access (EUTRA)", or "Further EUTRA (FEUTRA)") for cellular mobile communication have been studied in the 3rd Generation Partnership Project (3GPP). Note that, in the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and a gNodeB in NR, and a terminal device (mobile station, mobile station device, or terminal) is also referred to as a user equipment (UE). LTE and NR are cellular communication systems in which a plurality of areas covered by base stations is arranged in a form of cells. A single base station may manage a plurality of cells.

In NR, a component carrier (CC) can be divided into a plurality of frequency bandwidth parts (BWP) and used. Regarding the BWP, Patent Document 1 below discloses a technology for feeding back a precoding matrix indicator (PMI) for each BWP.

CITATION LIST

Patent Document

Patent Document 1: Japanese Patent Application Laid-Open No. 2012-44316

SUMMARY OF THE INVENTION

Problems to be Solved by the Invention

In NR, it has been considered to perform beam sweeping, in which a measurement signal (known signal) is transmitted or received using each of a plurality of beams belonging to a beam group, in a procedure for selecting an optimal beam to be used for communication. However, in an environment where a plurality of frequency bandwidths (CCs and/or BWPs) exists, the beam selection procedure on the plurality of frequency bandwidths is a burden to the terminal device.

Therefore, the present disclosure provides a mechanism capable of reducing a burden on a beam selection procedure on a plurality of frequency bandwidths.

Solutions to Problems

According to the present disclosure, a communication device is provided, the communication device including: a setting section that performs setting of beam groups defined in a plurality of frequency bandwidths, respectively; and a notification section that notifies a terminal device of information regarding identicalness between the beam groups defined in the frequency bandwidths different from each other.

Further, according to the present disclosure, a communication device is provided, the communication device including: a measurement reporting section that measures, on the basis of information regarding identicalness between beam groups defined in frequency bandwidths different from each other for beam groups defined in a plurality of the frequency bandwidths, respectively, a measurement signal that is beam-sweeping transmitted by another communication device by using a beam group, and reports a measurement result, the information being notified from the another communication device.

Further, according to the present disclosure, a communication method performed by a processor is provided, the communication method including: performing setting of beam groups defined in a plurality of frequency bandwidths, respectively; and notifying a terminal device of information regarding identicalness between the beam groups defined in the frequency bandwidths different from each other.

Further, according to the present disclosure, a communication method performed by a processor is provided, the communication method including: measuring, on the basis of information regarding identicalness between beam groups defined in frequency bandwidths different from each other for beam groups defined in a plurality of the frequency bandwidths, respectively, a measurement signal that is beam-sweeping transmitted by another communication device by using a beam group, and reporting a measurement result, the information being notified from the another communication device.

Further, according to the present disclosure, a recording medium, in which a program for causing a computer to function as a setting section and a notification section is recorded, is provided, the setting section performing setting of beam groups defined in a plurality of frequency bandwidths, respectively, and the notification section notifying a terminal device of information regarding identicalness between the beam groups defined in the frequency bandwidths different from each other.

Further, according to the present disclosure, a recording medium, in which a program for causing a computer to function as a measurement reporting section is recorded, is provided, the measurement reporting section measuring, on the basis of information regarding identicalness between beam groups defined in frequency bandwidths different from each other for beam groups defined in a plurality of the frequency bandwidths, respectively, a measurement signal that is beam-sweeping transmitted by another communication device by using a beam group, and reporting a measurement result, and the information being notified from the another communication device.

Effects of the Invention

According to the present disclosure, the mechanism capable of reducing a burden on the beam selection procedure on a plurality of frequency bandwidths is provided. Note that effects of the present disclosure are not necessarily limited to the effects described above, and, along with or instead of the effects described above, any of the effects

BRIEF DESCRIPTION OF DRAWINGS

FIG. 21 is a block diagram illustrating an example of a schematic configuration of a car navigation device.

MODE FOR CARRYING OUT THE INVENTION

Hereinafter, preferred embodiments of the present disclosure will be described in detail with reference to the accompanying drawings. Note that in the present specification and the drawings, constituent elements having substantially the same functional configuration are denoted by the same reference signs, and an overlapping description is omitted.

Note that descriptions will be provided in the following order.

1. Introduction
1.1. System Configuration
1.2. Related Technologies
1.3. Technical Problem
1.4. Outline of Proposed Technology
2. Example of Configuration
2.1. Example of Configuration of Base Station
2.2. Example of Configuration of Terminal Device
3. First Embodiment
3.1. Technical Problem
3.2. Technical Features
4. Second Embodiment
4.1. Technical Problem
4.2. Technical Features
5. Third Embodiment
5.1. Technical Problem
5.2. Technical Features
6. Application Example
7. Conclusion

1. INTRODUCTION

1.1. System Configuration

Figure 1:
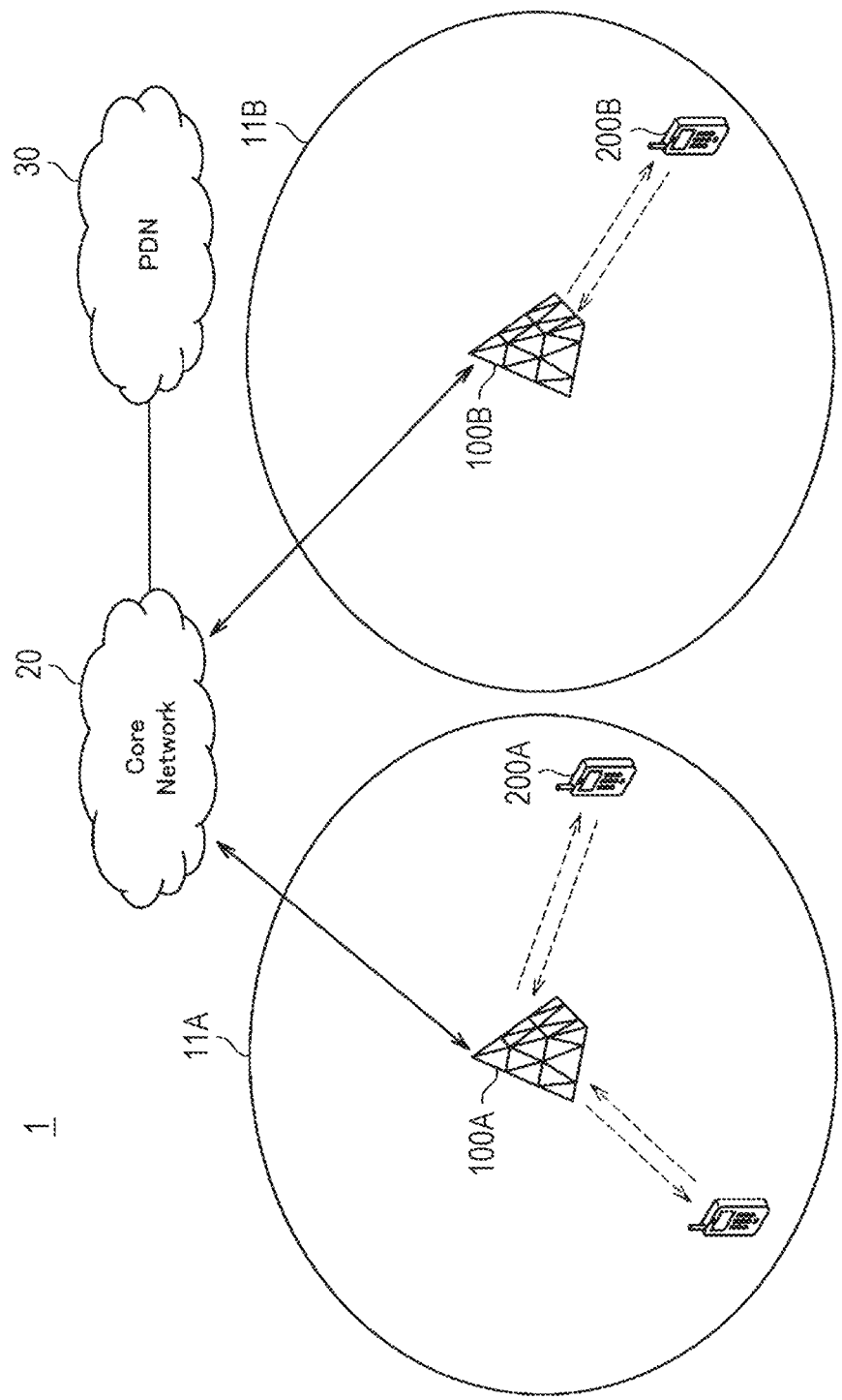
FIG. 1 is a diagram illustrating an example of an overall configuration of a system according to an embodiment of the present disclosure.

FIG. 1 is a diagram illustrating an example of an overall configuration of a system 1 according to an embodiment of the present disclosure. As illustrated in FIG. 1, the system 1 includes base stations 100 (100A and 100B), terminal devices 200 (200A and 200B), a core network 20, and a packet data network (PDN) 30.

The base station 100 is a communication device that operates a cell 11 (11A or 11B) and provides a wireless service to one or more terminal devices located inside the cell 11. For example, the base station 100A provides the wireless service to the terminal device 200A, and the base station 100B provides the wireless service to the terminal device 200B. The cell 11 can be operated according to an arbitrary wireless communication scheme such as LTE, New Radio (NR), or the like. The base station 100 is connected to the core network 20. The core network 20 is connected to the PDN 30.

The core network 20 can include, for example, a mobility management entity (MME), a serving gateway (S-GW), a PDN gateway (P-GW), a policy and charging rule function (PCRF), and a home subscriber server (HSS). The MME is a control node that handles a control plane signal, and manages a movement state of the terminal device. The S-GW is a control node that handles a user plane signal, and is a gateway device that switches between user data transfer paths. The P-GW is a control node that handles a user plane signal, and is a gateway device that serves as a connection point between the core network 20 and the PDN 30. The PCRF is a control node that performs a control related to policies such as quality of service (QoS) and the like for bearers and charging. The HSS is a control node that handles subscriber data and performs a service control.

The terminal device 200 is a communication device that performs wireless communication with the base station 100 on the basis of the control performed by the base station 100. The terminal device 200 may be a so-called user equipment (UE). For example, the terminal device 200 transmits an uplink signal to the base station 100 and receives a downlink signal from the base station 100.

1.2. Related Technologies

(1) BWP

Figure 2:
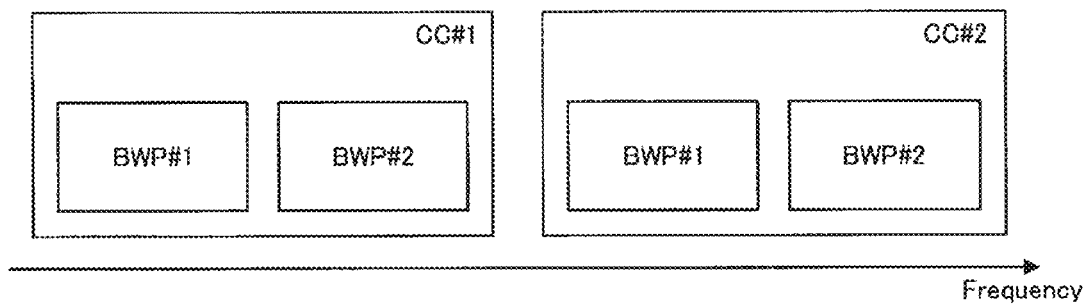
FIG. 2 is a diagram for describing a BWP.

FIG. 2 is a diagram for describing a bandwidth part (BWP). As illustrated in FIG. 2, a CC #1 includes a plurality of BWPs (#1 and #2), and a CC #2 includes a plurality of BWPs (#1 and #2). Note that, in the present specification, a number after # indicates an index. BWPs included in different CCs indicate different BWPs even in a case where they have the same index. The BWPs are a plurality of frequency bandwidths into which a CC, which is one operation bandwidth, is divided. A different subcarrier spacing can be set for each BWP.

The BWP has been standardized as a basic frame format for NR in 3GPP Rel 15. In an OFDM modulation scheme standardized by Rel8 for LTE, the subcarrier spacing was fixed at 15 kHz. On the other hand, in Rel 15, the subcarrier spacing can be set to 60 kHz, 120 kHz, or 240 kHz. The longer the subcarrier spacing, the smaller the OFDM symbol length. For example, in LTE, since the subcarrier spacing is 15 kHz, it has been possible to transmit one slot per ms, in other words, it has been possible to transmit 14 OFDM symbols. On the other hand, in NR, it is possible to transmit two slots in a case where the subcarrier spacing is 60 kHz, four slots in a case where the subcarrier spacing is 120 kHz, and eight slots in a case where the subcarrier spacing is 240 kHz. As such, the longer the subcarrier, the smaller the OFDM symbol length. Therefore, it is possible to provide a frame configuration suitable for low-delay communication.

In NR, BWPs with different subcarrier spacings can be provided at the same time. Therefore, in NR, a plurality of BWPs corresponding to different use cases can be provided at the same time.

(2) Number of Active BWPs

A BWP on which transmission and reception can be performed is also referred to as an active BWP. Further, the number of BWPs on which transmission and reception can be performed at the same time is also referred to as the number of active BWPs. The number of active BWPs of the base station 100 is plural. On the other hand, the number of active BWPs of the terminal device 200 may be one. It is a matter of course that a terminal device 200 with a plurality of active BWPs can also be expected to appear in the future. These scenarios are shown in Table 1 below.

TABLE 1

Table 1. Scenarios Related to Number of Active BWPs

| Scenarios | Active BWP |
|---|---|
| 3GPP Rel15 | Terminal Device Can Use Only One BWP at the Same Time |
| Possible Scenario in Future | Terminal Device Can Use a Plurality of BWPs at the Same Time |

Note that the technology according to the present disclosure can be applied to both a case where the number of active BWPs of the terminal device 200 is one and a case where the number of active BWPs of the terminal device 200 is plural.

(3) Codebook-Based Beamforming

The base station 100 can improve, for example, communication quality, by performing beamforming to perform communication with the terminal device 200. A beamforming method includes a method of generating a beam that follows the terminal device 200 and a method of selecting, from candidate beams, a beam that follows the terminal device 200. It is difficult to adopt the former method in future wireless communication systems (for example, 5G) because a computational cost is involved each time a beam is generated. On the other hand, the latter method is adopted also in full dimension multiple input multiple output (FD-MIMO) of release 13 of third generation partnership project (3GPP). The latter method is also referred to as codebook-based beamforming.

In the codebook-based forming, the base station 100 prepares (that is, generates) a beam in all directions in advance, selects, from the beams prepared in advance, a beam suitable for a target terminal device 200, and performs communication with the terminal device 200 using the selected beam. For example, in a case where the base station 100 can perform communication at 360 degrees in a horizontal direction, for example, 360 types of beams are prepared in increments of 1 degree. In a case where the beams are set so that the beams overlap with each other by half, the base station 100 prepares 720 types of beams. In a vertical direction, the base station 100 prepares beams corresponding to 180 degrees, for example, from −90 degrees to +90 degrees.

Note that since the terminal device 200 only observes the beam, there is less necessary to know the existence of a codebook in the base station 100.

Hereinafter, a plurality of beams prepared in advance by the base station 100 is also referred to as a beam group. The beam group can be defined for each frequency band, for example. Furthermore, the beam group can be defined for each Rx/Tx beam and for each of downlink/uplink.

(4) Beam Sweeping

In NR, it has been considered to perform beam sweeping, in which a measurement signal (known signal) is transmitted or received using each of a plurality of beams belonging to a beam group, in order to select an optimal beam to be used for communication. The measurement signal may also be referred to as a reference signal. An optimal transmission beam (hereinafter, also referred to as a Tx beam) can be selected on the basis of a measurement result of the measurement signal transmitted while performing beam sweeping. An example thereof will be described with reference to FIG. 3.

Figure 3:
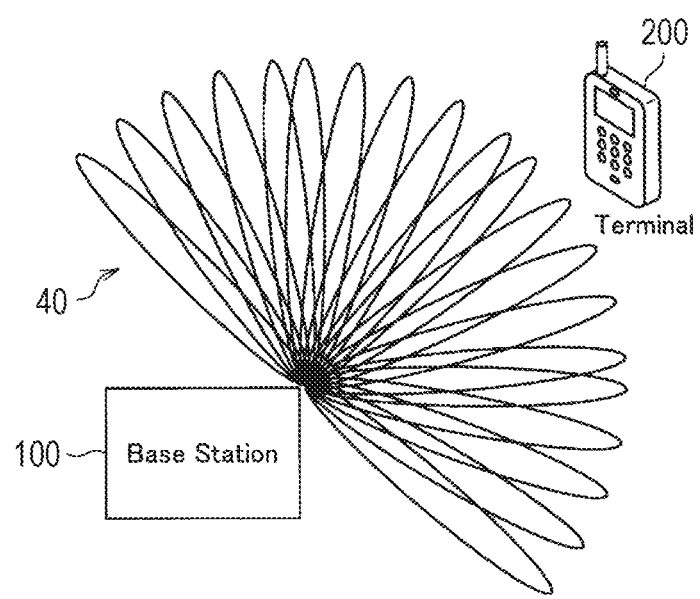
FIG. 3 is a diagram for describing beam sweeping.

FIG. 3 is a diagram for describing the beam sweeping. In the example illustrated in FIG. 3, the base station 100 transmits a measurement signal while performing the beam sweeping (that is, switching the Tx beam) by using a beam group 40. Note that, hereinafter, transmission while the beam sweeping is performed is also referred to as beam sweeping transmission. Further, the terminal device 200 measures a beam-sweeping transmitted measurement signal and determines which Tx beam is the most suitable for reception. In this way, the optimal Tx beam of the base station 100 is selected. Note that the base station 100 can select an optimal Tx beam of the terminal device 200 by exchanging the base station 100 and the terminal device 200 and performing a similar procedure.

On the other hand, an optimal reception beam (hereinafter, also referred to as an Rx beam) can be selected on the basis of a measurement result obtained by receiving a measurement signal while performing the beam sweeping. For example, the terminal device 200 transmits a measurement signal in uplink. Then, the base station 100 receives the measurement signal while performing the beam sweeping (that is, switching the Rx beam), and determines which Rx beam is the most suitable for reception. In this way, the optimal Rx beam of the base station 100 is selected. Note that the terminal device 200 can select an optimal Rx beam of the terminal device 200 by exchanging the base station 100 and the terminal device 200 and performing a similar procedure. Further, hereinafter, reception while the beam sweeping is performed is also referred to as beam sweeping reception.

A side that receives and measures a beam-sweeping transmitted measurement signal reports a measurement result to a side that transmits the measurement signal. The measurement result includes information indicating which Tx beam is optimal. The optimal Tx beam is, for example, a Tx beam with the highest received power. The measurement result may include information indicating one Tx beam with the highest received power, or may include information indicating the top K Tx beams with high received power. The measurement result includes, for example, identification information of a Tx beam (for example, an index of a beam) and information indicating the magnitude of received power of a Tx beam (for example, reference signal received power (RSRP)) in association with each other.

Note that, in the Tx beam selection procedure, a measurement signal is beam-sweeping transmitted by using each of a plurality of Tx beams belonging to a beam group. It can be said that each Tx beam is identified by a resource called a measurement signal. The measurement signal transmitted using a beam may also be referred to as a beam resource. Furthermore, a measurement signal that is beam-sweeping transmitted by using a beam group may also be referred to as a beam resource group.

1.3. Technical Problem

In NR, it is assumed that a communication service is provided in an environment where a plurality of frequency bandwidths exists. In such an environment, the beam selection procedure on the plurality of frequency bandwidths is a burden to the terminal device. As an example, an example of a beam selection procedure on each BWP in an environment where a plurality of BWPs exists will be described with reference to FIG. 4.

Figure 4:
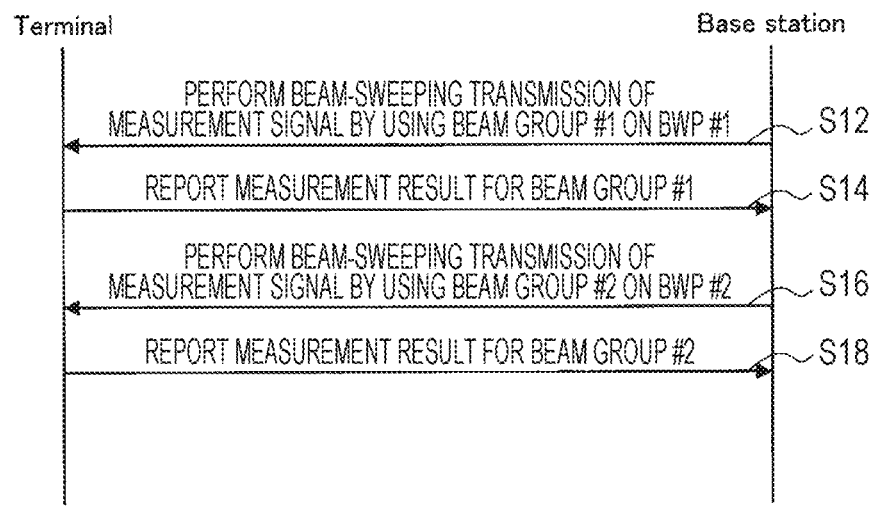
FIG. 4 is a sequence diagram illustrating an example of a flow of typical measurement reporting processing performed by a base station and a terminal device.

FIG. 4 is a sequence diagram illustrating an example of a flow of typical measurement reporting processing performed by a base station and a terminal device. As illustrated in FIG. 4, the base station performs beam-sweeping transmission of a measurement signal by using a beam group #1 for a BWP #1 on the BWP #1 (Step S12). Next, the terminal device measures the measurement signal that is beam-sweeping transmitted by using the beam group #1 on the BWP #1, and reports a measurement result to the base station (Step S14). Next, the base station performs beam-sweeping transmission of a measurement signal by using a beam group #2 for a BWP #2 on the BWP #2 (Step S16). Next, the terminal device measures the measurement signal that is beam-sweeping transmitted by using the beam group #2 on the BWP #2, and reports a measurement result to the base station (Step S18).

Since such a beam selection procedure for each frequency bandwidth is a burden to the terminal device, it is desirable to reduce the burden.

1.4. Outline of Proposed Technology

In the proposed technology, information regarding identicalness between beam groups defined in different frequency bandwidths (CCs and/or BWPs) is provided to the terminal device 200. The terminal device 200 shares (for example, diverts) a measurement result in common for identical parts of a plurality of beam groups on the basis of the provided information regarding identicalness. This makes it possible to reduce the burden on the terminal device 200 in the beam selection procedure in an environment where a plurality of CCs and/or a plurality of BWPs exists.

As a technology that seems to be similar to the proposed technology, TS38.214 specifies that the base station transmits information indicating whether or not different reference signals may be regarded as being transmitted from the same base station. More specifically, it is specified that the base station transmits information indicating whether or not an antenna port #0 and an antenna port #1 transmit beams in the same direction. However, such information merely indicates a relationship between beams of antenna ports, and does not indicate a relationship between beams of different BWPs or different CCs as in the proposed technology. In addition, the information specified in TS38.214 is not information for a beam group as in the proposed technology, but is information for each beam.

2. EXAMPLE OF CONFIGURATION

2.1. Example of Configuration of Base Station

Figure 5:
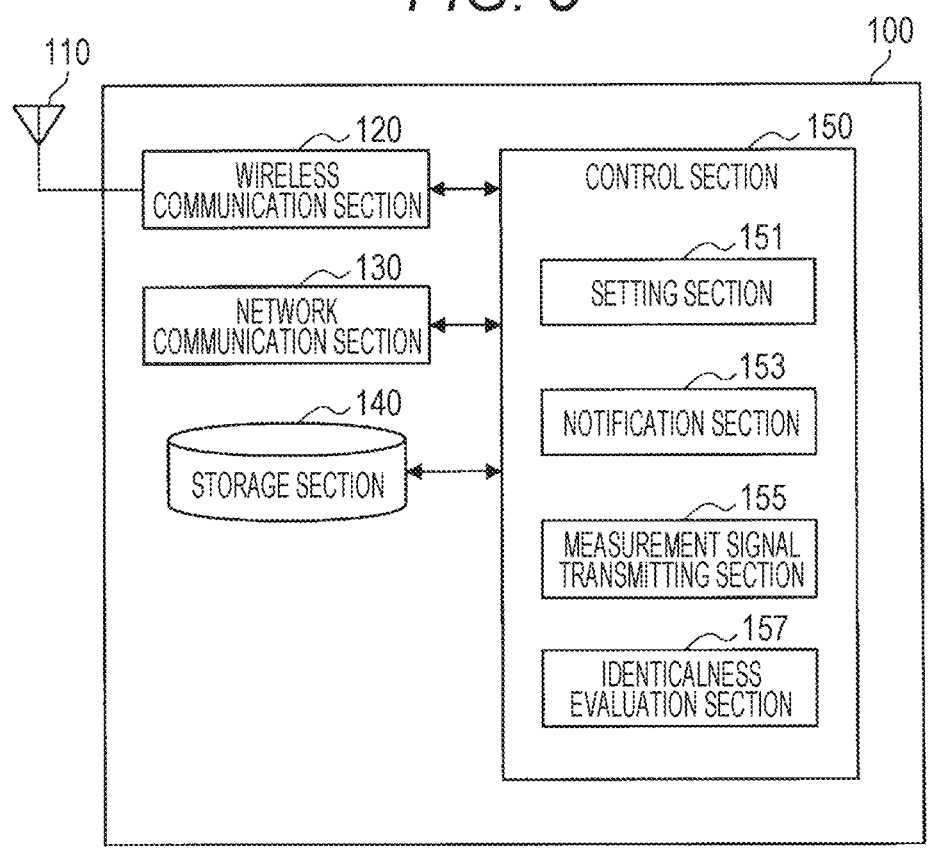
FIG. 5 is a block diagram illustrating an example of a configuration of a base station according to the embodiment.

FIG. 5 is a block diagram illustrating an example of a configuration of the base station 100 according to the present embodiment. Referring to FIG. 5, the base station 100 includes an antenna section 110, a wireless communication section 120, a network communication section 130, a storage section 140, and a control section

(1) Antenna Section 110

The antenna section 110 radiates a signal output from the wireless communication section 120 as radio waves in the air. Furthermore, the antenna section 110 converts radio waves in the air into a signal and outputs the signal to the wireless communication section 120.

In particular, in the present embodiment, the antenna section 110 includes a plurality of antenna elements and can form a beam.

(2) Wireless Communication Section 120

The wireless communication section 120 transmits and receives a signal. For example, the wireless communication section 120 transmits a downlink signal to a terminal device and receives an uplink signal from a terminal device.

In particular, in the present embodiment, the wireless communication section 120 can perform communication with a terminal device by using a plurality of beams formed by the antenna section 110.

(3) Network Communication Section 130

The network communication section 130 transmits and receives information. For example, the network communication section 130 transmits information to another node and receives information from another node. Examples of the another node described above include other base stations and core network nodes.

(4) Storage Section 140

The storage section 140 temporarily or permanently stores a program for the operation of the base station 100 and various data.

(5) Control Section 150

The control section 150 controls the entire operation of the base station 100 to provide various functions of the base station 100. The control section 150 includes a setting section 151, a notification section 153, a measurement signal transmitting section 155, and an identicalness evaluation section 157.

The setting section 151 has a function of performing setting related to communication with the terminal device 200. For example, the setting section 151 performs resource configuration as described later and transmits, to the terminal device 200, resource configuration information indicating a resource configuration result.

The notification section 153 has a function of notifying the terminal device 200 of the identicalness information as described later. For example, the notification section 153 notifies of information indicating a relationship between beam directions of downlink beam groups and/or setting information of a measurement report. Further, for example, the notification section 153 notifies of information regarding beam sweeping linkage using a plurality of beam groups. Further, for example, the notification section 153 notifies of an indication for evaluating identicalness between uplink beam groups and information that designates a target uplink beam group of the beam sweeping.

The measurement signal transmitting section 155 has a function of transmitting a measurement signal in downlink. Specifically, the measurement signal transmitting section 155 performs beam-sweeping transmission of a measurement signal by using a beam group defined for each frequency bandwidth on each of the plurality of frequency bandwidths.

The identicalness evaluation section 157 has a function of evaluating identicalness between uplink beam groups. Specifically, the identicalness evaluation section 157 measures the measurement signal that is beam-sweeping transmitted by the terminal device 200 by using the beam group defined for each frequency bandwidth on each of the plurality of frequency bandwidths, and evaluates identicalness on the basis of a measurement result.

The control section 150 can further include other constituent elements other than these constituent elements. That is, the control section 150 can perform operations other than the operations of these constituent elements.

2.2. Example of Configuration of Terminal Device

Figure 6:
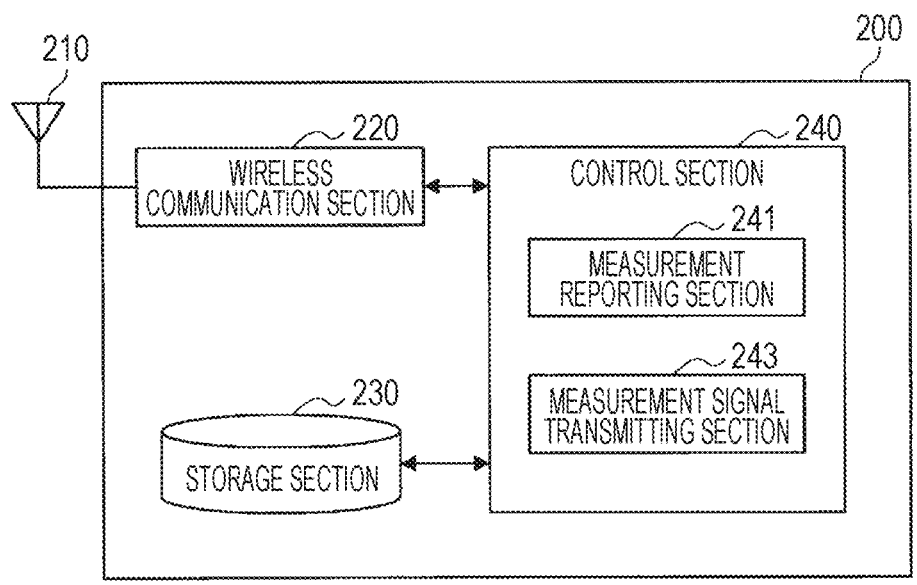
FIG. 6 is a block diagram illustrating an example of a configuration of a terminal device according to the embodiment.

FIG. 6 is a block diagram illustrating an example of a configuration of the terminal device 200 according to the present embodiment. Referring to FIG. 6, the terminal device 200 includes an antenna section 210, a wireless communication section 220, a storage section 230, and a control section 240.

(1) Antenna Section 210

The antenna section 210 radiates a signal output from the wireless communication section 220 as radio waves in the air. Furthermore, the antenna section 210 converts radio waves in the air into a signal and outputs the signal to the wireless communication section 220.

In particular, in the present embodiment, the antenna section 210 includes a plurality of antenna elements and can form a beam.

(2) Wireless Communication Section 220

The wireless communication section 220 transmits and receives a signal. For example, the wireless communication section 220 receives a downlink signal from a base station and transmits an uplink signal to a base station.

In particular, in the present embodiment, the wireless communication section 220 can perform communication with a base station by using a plurality of beams formed by the antenna section 210.

(3) Storage Section 230

The storage section 230 temporarily or permanently stores a program for the operation of the terminal device 200 and various data.

(4) Control Section 240

The control section 240 controls the entire operation of the terminal device 200 to provide various functions of the terminal device 200. The control section 240 includes a measurement reporting section 241 and a measurement signal transmitting section 243.

The measurement reporting section 241 has a function of measuring a measurement signal transmitted from the base station 100 and reporting a measurement result to the base station 100. Specifically, the measurement reporting section 241 measures a measurement signal that is beam-sweeping transmitted by the base station 100 on the basis of the identicalness information notified from the base station 100, and reports a measurement result to the base station 100.

The measurement signal transmitting section 243 has a function of transmitting a measurement signal in uplink. Specifically, the measurement signal transmitting section 243 performs beam-sweeping transmission of a measurement signal by using a beam group defined for each frequency bandwidth on each of the plurality of frequency bandwidths.

The control section 240 can further include other constituent elements other than these constituent elements. That is, the control section 240 can perform operations other than the operations of these constituent elements.

3. FIRST EMBODIMENT

In the present embodiment, a measurement result of a measurement signal that is beam-sweeping transmitted by using a beam group defined in a certain frequency bandwidth is used as a measurement result of a measurement signal that is beam-sweeping transmitted by using a beam group defined in another frequency bandwidth.

3.1. Technical Problem

The technical problem of the present embodiment is as described above. Specifically, in an environment where a plurality of frequency bandwidths exists, the beam selection procedure on the plurality of frequency bandwidths is a burden to the terminal device. This is because as the number of times the beam selection procedure is performed increases, the amount of calculation increases, and power consumption increases accordingly. Furthermore, since wireless resources for beam sweeping are prepared in all frequency bandwidths, the overhead of the wireless resources also increases.

Therefore, it is desirable that at least a part of the beam selection procedure on a plurality of frequency bandwidths is shared in common.

3.2. Technical Features

The base station 100 (for example, the setting section 151) performs setting of beam groups defined in a plurality of frequency bandwidths, respectively. For example, the base station 100 performs resource configuration for the beam groups defined in the plurality of frequency bandwidths, respectively. The resource configuration includes setting wireless resources (for example, frequency resources and/or time resources) used for beam-sweeping transmission of a measurement signal using a beam group for each frequency bandwidth. Furthermore, the resource configuration can also include associating each of a plurality of beams belonging to a beam group with a measurement signal transmitted using the beam.

The base station 100 (for example, the setting section 151) transmits, to the terminal device 200, the resource configuration information indicating a result of the resource configuration. For example, the resource configuration information can include at least information indicating a wireless resource used for beam-sweeping transmission of a measurement signal using a beam group. Further, the resource configuration information can include information that associates a frequency bandwidth with a beam group defined in the frequency bandwidth. Further, the resource configuration information can include information that associates each of a plurality of beams belonging to a beam group, a measurement signal transmitted using the beam, and a wireless resource used for transmission of the measurement signal to one another for each beam group.

The base station 100 (for example, the notification section 153) notifies the terminal device 200 of information regarding identicalness between beam groups defined in different frequency bandwidths. Hereinafter, the information regarding identicalness between beam groups is also referred to as identicalness information. Higher layer signaling, system information, downlink control information (DCI), or dedicated signaling can be used for notification of the identicalness information.

Note that the technical features of the present embodiment will be described using a first beam group defined in a first frequency bandwidth and a second beam group defined in a second frequency bandwidth. The first frequency bandwidth is also referred to as a BWP #1, the first beam group is also referred to as a beam group #1, the second frequency bandwidth is also referred to as a BWP #2, and the second beam group is also referred to as a beam group #2. In a case where directions of beams of the beam group #1 and directions of beams of the beam group #2 are identical to each other, the measurement for the beam group #1 is performed, and at least a part of the measurement for the beam group #2 is omitted.

Hereinafter, an outline of the identicalness information according to the present embodiment will be described with reference to FIG. 7.

Figure 7:
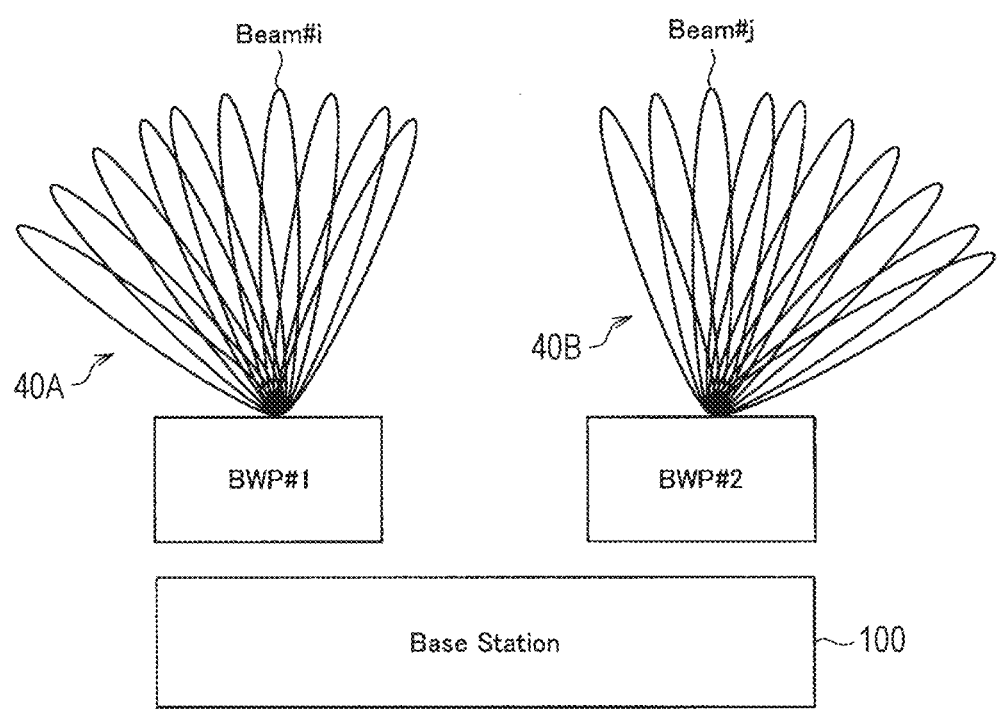
FIG. 7 is a diagram for describing an outline of identicalness information according to a first embodiment.

FIG. 7 is a diagram for describing an outline of the identicalness information according to the present embodiment. As illustrated in FIG. 7, the base station 100 can transmit a beam group 40A as the beam group #1 defined in the BWP #1 and transmit a beam group 40B as the beam group #2 defined in the BWP #2. The beam direction is the same between the beam group #1 and the beam group #2. For example, as illustrated in FIG. 7, a direction of a beam #i belonging to the beam group #1 and a direction of a beam #j belonging to the beam group #2 are the same each other.

The identicalness information can include information indicating a relationship between beam directions of beam groups. In the example illustrated in FIG. 7, the identicalness information can include information indicating that the direction of the beam #i and the direction of the beam #j are identical to each other. By providing such information to the terminal device 200, the terminal device 200 can use a measurement result for one of the beam #i and the beam #j in place of a measurement result for the other one. In other words, the terminal device 200 can measure one of the beam #i and the beam #j and omit measurement for the other one. As a result, the load on the terminal device 200 is reduced.

The identicalness information can include setting information of a measurement report. In the example illustrated in FIG. 7, the identicalness information includes information that sets a measurement result for one of the beam #i and the beam #j to be reported in place of a measurement result for the other one. By providing such information to the terminal device 200, the terminal device 200 can use a measurement result for one of the beam #i and the beam #j in place of a measurement result for the other one. In other words, the terminal device 200 can measure one of the beam #i and the beam #j and omit measurement for the other one. As a result, the load on the terminal device 200 is reduced.

As described above, according to the present embodiment, at least a part of the beam selection procedure on a plurality of frequency bandwidths is shared in common, such that the load on the terminal device 200 is reduced. Hereinafter, a case where the identicalness information includes information indicating a relationship between beam directions of beam groups and a case where the identicalness information includes a setting information of a measurement report will be sequentially described in detail.

(1) Information Indicating Relationship Between Beam Directions of Beam Groups The identicalness information can include information indicating a relationship between beam directions (that is, directivity) of beam groups. Specifically, the identicalness information can include information indicating whether or not a characteristic regarding a beam direction is identical between a plurality of beam groups defined in different frequency bandwidths. For example, the identicalness information can include information indicating that directions of beams belonging to the beam group #1 and directions of beams belonging to the beam group #2 are at least partially identical to each other. Note that the expression that directions of a plurality of beams are identical to each other means that the directions of the plurality of beams are the same as each other. Further, the expression that directions of a plurality of beams are identical to each other means that calibration of an analogue circuit of the base station 100 has been completed so that the plurality of beams are transmitted in the same direction.

A Case where all Beams Belonging to a Beam Group are Identical

The identicalness information includes information indicating that directions (for example, directivity) of beams belonging to the beam group #1 and directions of beams belonging to the beam group #2 are all identical to each other. For example, the identicalness information includes identification information of the beam group #1, identification information of the beam group #2, and information indicating that the directions of the beams of the beam group #1 and the directions of the beams of the beam group #2 are identical to each other. Note that the identification information of the beam group is an index of a beam group (for example, a beam group ID), an index of a beam belonging to a beam group (for example, a beam ID), identification information of a measurement signal that is beam-sweeping transmitted using a beam group, or information indicating a wireless resource for beam-sweeping transmission using a beam group.

Figure 8:
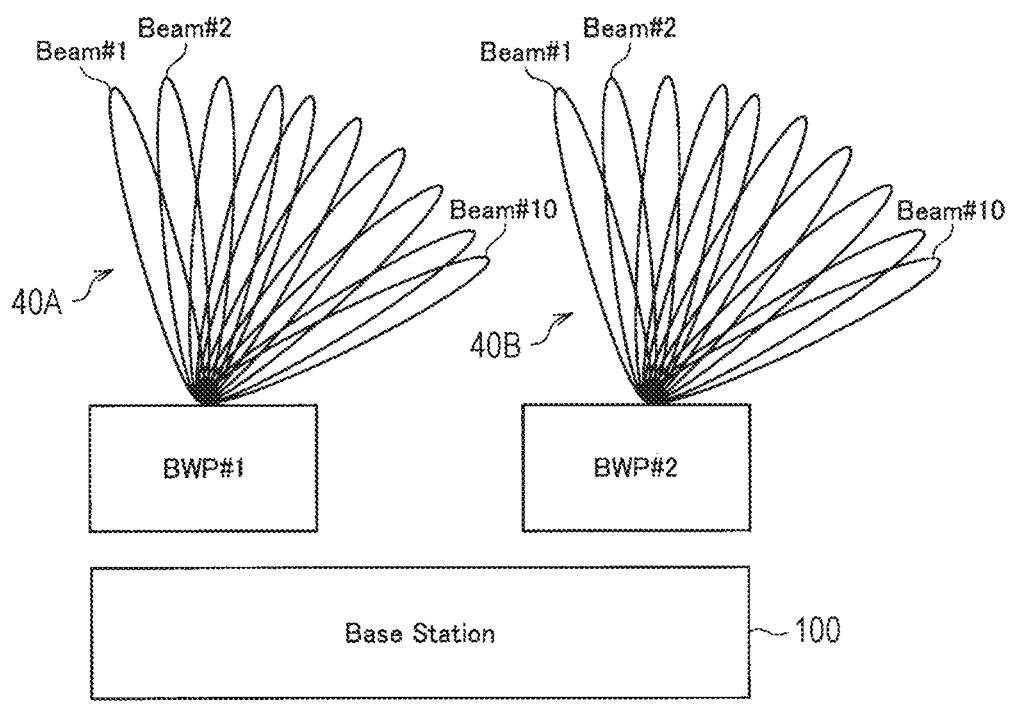
FIG. 8 is a diagram for describing a specific example of a case where all beams belonging to a beam group are identical.

FIG. 8 is a diagram for describing a specific example of a case where all beams belonging to a beam group are identical. As illustrated in FIG. 8, the base station 100 can transmit a beam group 40A as the beam group #1 and transmit a beam group 40B as the beam group #2. The beam group #1 and the beam group #2 include the following beams, respectively.

Beam group #1:
Beam #1, Beam #2, . . . , and Beam #10
Beam group #2:
Beam #1, Beam #2, . . . , and Beam #10

Here, it is assumed that beams having the same index have the identical directivity. Note that the specific example illustrated in FIG. 8 is also referred to as a first specific example.

In the first specific example, the directivity of the beam belonging to the beam group #1 and the directivity of the beam belonging to the beam group #2 are identical to each other. Accordingly, the identicalness information includes information indicating that directions of the beams belonging to the beam group #1 and directions of the beams belonging to the beam group #2 are identical to each other.

The terminal device 200 (for example, the measurement reporting section 241) measures a measurement signal that is beam-sweeping transmitted by the base station 100 by using a beam group on the basis of the identicalness information notified from the base station 100, and reports a measurement result. Specifically, the terminal device 200 selects a beam group as a measurement target among a plurality of beam groups that can be used for beam-sweeping transmission of a measurement signal by the base station 100 on the basis of the identicalness information notified from the base station 100. Further, the terminal device 200 performs measurement for the beam group that is the measurement target, and does not perform measurement for a beam group that is not the measurement target. The terminal device 200 reports, to the base station 100, a measurement result for the beam group that is the measurement target, in place of a measurement result for a beam group that is not the measurement target.

For example, the terminal device 200 reports a measurement result for the beam group #1 as a measurement result for the beam group #2. In the first specific example, the terminal device 200 reports, to the base station 100, a measurement result of a measurement signal that is beam-sweeping transmitted by using the beam group #1, in place of a measurement result of a measurement signal that is beam-sweeping transmitted by using the beam group #2. The terminal device 200 does not have to measure the measurement signal that is beam-sweeping transmitted by using the beam group #2. In this case, the terminal device 200 can omit the measurement for the beam group #2, such that the burden is reduced.

Hereinafter, an example of a flow of the beam selection processing in the first specific example described with reference to FIG. 8 will be described with reference to FIG. 9.

Figure 9:
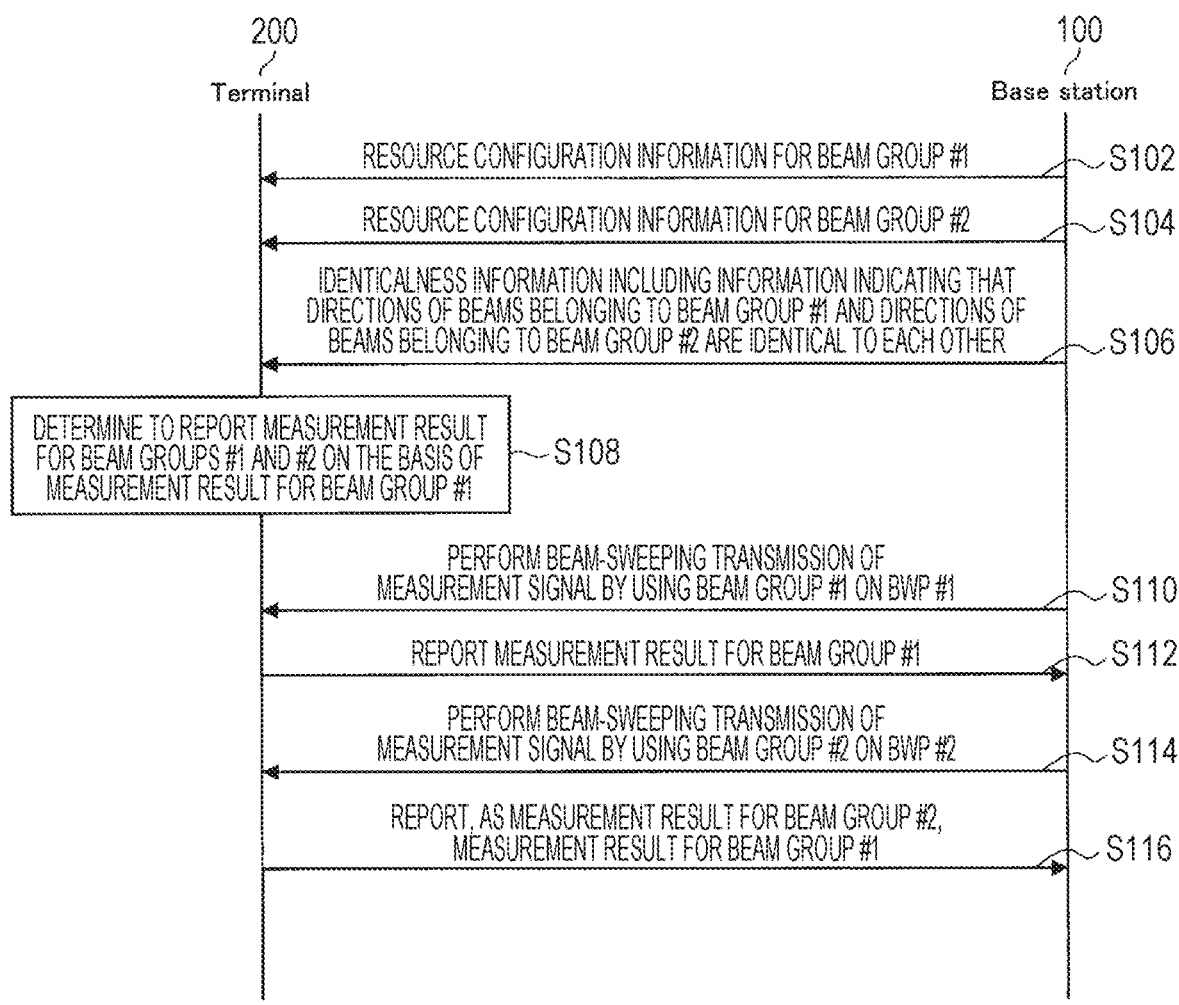
FIG. 9 is a sequence illustrating an example of a flow of beam selection processing performed by a system according to the embodiment.

FIG. 9 is a sequence illustrating an example of a flow of the beam selection processing performed by the system 1 according to the present embodiment. As illustrated in FIG. 9, the base station 100 and the terminal device 200 are involved in this sequence. First, the base station 100 transmits, to the terminal device 200, resource configuration information for the beam group #1 (Step S102). Further, the base station 100 transmits, to the terminal device 200, resource configuration for the beam group #2 (Step S104). Next, the base station 100 transmits, to the terminal device 200, the identicalness information including information indicating that directions of the beams belonging to the beam group #1 and directions of the beams belonging to the beam group #2 are identical to each other (Step S106).

Then, the terminal device 200 determines, on the basis of the received identicalness information, to report measurement results for the beam groups #1 and #2 on the basis of measurement result for the beam group #1 (Step S108). Next, the base station 100 performs beam-sweeping transmission of a measurement signal by using the beam group #1 on the BWP #1 (Step S110). Next, the terminal device 200 measures a measurement signal that is beam-sweeping transmitted by using the beam group #1 on the BWP #1, and reports a measurement result to the base station 100 (Step S112). Next, the base station 100 performs beam-sweeping transmission of a measurement signal by using the beam group #2 on the BWP #2 (Step S114). Next, the terminal device 200 reports, to the base station 100, a measurement result of the measurement signal that is beam-sweeping transmitted by using the beam group #1 on the BWP #1, in replace of a measurement result for the beam group #2 (Step S116).

Here, the base station 100 may omit transmission of a measurement signal using a beam that is identical to a beam belonging to another beam group, among beams belonging to a plurality of beam groups. Specifically, the base station 100 may omit the processing in Step S114. In this case, a wireless resource for beam-sweeping transmission of a measurement signal on the BWP #2 can be released, such that the resource efficiency can be improved.

A Case where Subsets of Beam Groups are Identical

Directions of beams belonging to a subset of the beam group #1 and directions of beams belonging to the beam group #2 may be identical to each other. In this case, the identicalness information includes information indicating that directions of the beams belonging to the beam group #1 and directions of the beams belonging to the beam group #2 are partially identical to each other. Specifically, the identicalness information includes information indicating that directions of beams belonging to a subset of the beam group #1 and directions of the beams belonging to the beam group #2 are identical to each other. For example, the identicalness information can include identification information of the beam group #1, identification information of the beam group #2, and information indicating a subset of the beam group #1 that includes beams of which directions are identical to those of the beam group #2.

Note that directions of beams of a subset of the beam group #1 and directions of beams of a subset of the beam group #2 may be identical to each other. In this case, the identicalness information includes information indicating that the directions of the beams of the subset of the beam group #1 and the directions of beams of the subset of the beam group #2 are identical to each other. For example, the identicalness information can include identification information of the beam group #1, identification information of the beam group #2, and information indicating the subset of the beam group #1 and the subset of the beam group #2 that have identical beam directions.

Figure 10:
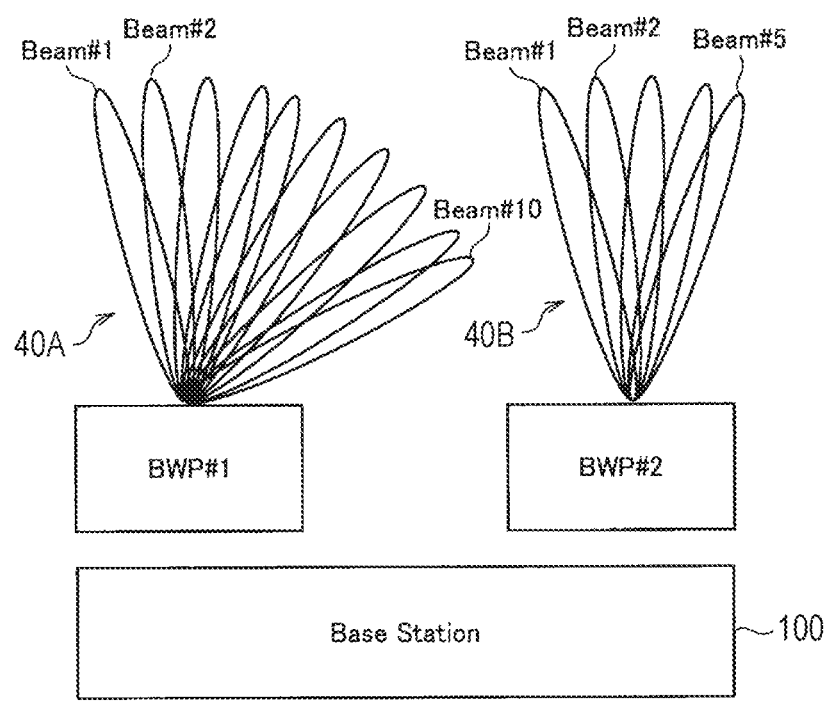
FIG. 10 is a diagram for describing a specific example of a case where a subset of a beam group is identical.

FIG. 10 is a diagram for describing a specific example of a case where a subset of a beam group is identical. As illustrated in FIG. 10, the base station 100 can transmit a beam group 40A as the beam group #1 and transmit a beam group 40B as the beam group #2. For example, the beam group #1 and the beam group #2 include the following beams, respectively.

Beam group #1:
Beam #1, Beam #2, . . . , Beam #5, . . . , and Beam #10
Beam group #2:
Beam #1, Beam #2, . . . , and Beam #5

Here, it is assumed that beams having the same index have the identical directivity. Note that the specific example illustrated in FIG. 10 is also referred to as a second specific example.

In the second specific example, directions of beams #1 to #5 belonging to a subset of the beam group #1 and directions of beams #1 to #5 belonging to the beam group #2 are identical to each other. Therefore, the identicalness information includes information indicating that directions of beams belonging to a subset of the beam group #1 and directions of the beams belonging to the beam group #2 are identical to each other.

The terminal device 200 (for example, the measurement reporting section 241) selects a beam group as a measurement target among a plurality of beam groups that can be used for beam-sweeping transmission of a measurement signal by the base station 100 on the basis of the identicalness information notified from the base station 100. Moreover, the terminal device 200 specifies a subset of the beam group that is the measurement target, for which a measurement result is to be reported in place of a measurement result for a beam groups that is not the measurement target. The terminal device 200 reports, to the base station 100, the measurement result for the specified subset of the beam group that is the measurement target, in place of a measurement result for a beam group that is not the measurement target.

For example, the terminal device 200 reports a measurement result for the subset of the beam group #1 as a measurement result for the beam group #2. In the second specific example, the terminal device 200 reports, to the base station 100, a measurement result of a measurement signal that is beam-sweeping transmitted by using the beams #1 to #5 belonging to the beam group #1, in place of a measurement result of a measurement signal that is beam-sweeping transmitted by using the beam group #2. For example, as a result of performing measurement for the beam group #1, received power of the beam #8 is the highest among the beams #1 to #10, and received power of the beam #5 is the highest among the beams #1 to #5. In this case, the terminal device 200 reports that the beam #8 is optimal as the measurement result for the beam group #1, and reports that the beam #5 is optimal as the measurement result for the beam group #2. The terminal device 200 does not have to measure the measurement signal that is beam-sweeping transmitted by using the beam group #2. In this case, the terminal device 200 can omit the measurement for the beam group #2, such that the burden is reduced.

(2) Setting Information of Measurement Report

The identicalness information can include setting information of a measurement report. Specifically, the identicalness information can include information that sets the measurement result for the beam group #2 to be reported on the basis of the measurement result for the beam group #1. In this case, the terminal device 200 can omit the measurement for the beam group #2, such that the burden is reduced. This will be described in detail below.

A Case where all Beams Belonging to a Beam Group are Identical

In a case where the directions of the beams belonging to the beam group #1 and the directions of the beams belonging to the beam group #2 are all identical to each other, the identicalness information can include information that sets the measurement result for the beam group #1 to be reported as the measurement result for the beam group #2. The terminal device 200 (for example, the measurement reporting section 241) reports the measurement result for the beam group #1 on the basis of the identicalness information notified from the base station 100. The base station 100 handles the measurement result for the beam group #1 as the measurement result for the beam group #2. The terminal device 200 can omit the measurement for the beam group #2, such that the burden is reduced. Further, the terminal device 200 originally does not have to receive the setting for the beam group #2.

A Case where Subsets of Beam Groups are Identical

First Example

In a case where the directions of the beams belonging to a subset of the beam group #1 and the directions of the beams belonging to the beam group #2 are identical to each other, the identicalness information can include information indicating a range of the beams belonging to the beam group #1, the range being to be reported as a measurement result for each of the beam group #1 and beam group #2. In particular, the identicalness information can include information indicating a range of the beams belonging to the beam group #1, the range being to be reported as a measurement result for the beam group #2. The range of the beams belonging to the beam group #1 may be regarded as a subset of the beam group #1.

The terminal device 200 (for example, the measurement reporting section 241) reports a measurement result for a subset of the beam group #1 on the basis of the identicalness information notified from the base station 100. For example, the terminal device 200 reports a measurement result for all the beams belonging to the beam group #1 as the measurement result for the beam group #1. Further, the terminal device 200 reports, as the measurement result for the beam group #2, a measurement result for beams in the range designated by the identicalness information among the beams belonging to the beam group #1. In this way, the terminal device 200 can omit the measurement for the beam group #2, such that the burden is reduced. Further, the terminal device 200 originally does not have to receive the setting for the beam group #2. Hereinafter, this will be specifically described with reference to FIG. 11.

Figure 11:
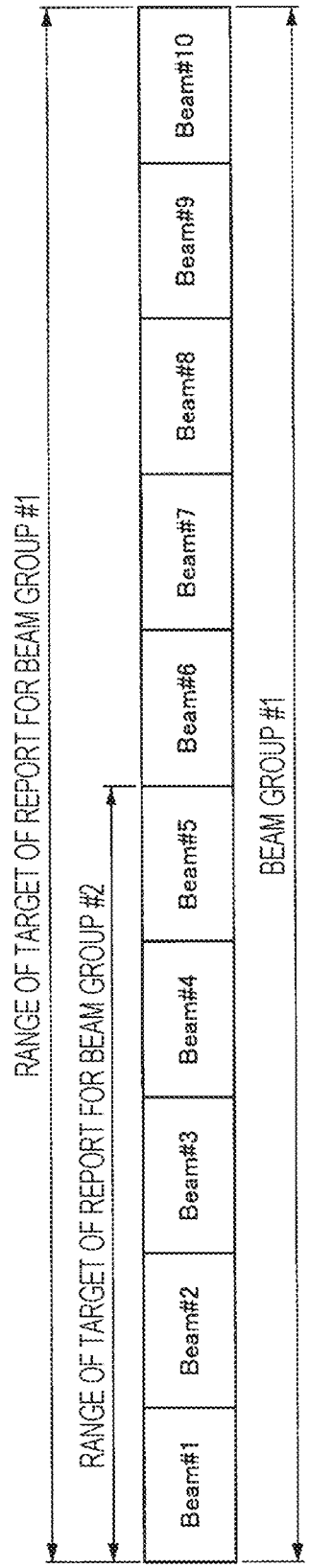
FIG. 11 is a diagram for describing an example of identicalness information according to the embodiment.

FIG. 11 is a diagram for describing an example of the identicalness information according to the present embodiment. The first example of the setting information of the measurement report in the second specific example described above will be described with reference to FIG. 11. As illustrated in FIG. 11, the beam group #1 for the BWP #1 includes beams #1 to #10. Further, a reporting target range in the beam group #1 is the beams #1 to #10. On the other hand, a reporting target range in the beam group #2 is beams #1 to #5.

The identicalness information includes setting information of a measurement report, the setting information indicating that the reporting target range in the beam group #1 is the beams #1 to #10. For example, the base station 100 notifies the terminal device 200 of information that sets a beam having maximum RSRP among the beams #1 to #10 of the beam groups #1 to be reported as the measurement result for the beam group #1. On the basis of such notification, the terminal device 200 reports, to the base station 100, as the measurement result for the beam group #1, information indicating the beam having the maximum RSRP among the beams #1 to #10 of the beam group #1.

Further, the identicalness information includes setting information of a measurement report, the setting information indicating that the reporting target range in the beam group #2 is the beams #1 to #5. For example, the base station 100 notifies the terminal device 200 of information that sets a beam having maximum RSRP among the beams #1 to #5 of the beam groups #1 to be reported as the measurement result for the beam group #2. On the basis of such notification, the terminal device 200 reports, to the base station 100, as the measurement result for the beam group #2, information indicating the beam having the maximum RSRP among the beams #1 to #5 of the beam group #1.

In this case, the base station 100 only needs to set the measurement report, and does not need to notify of the information indicating a relationship between directions of beams of beam groups.

Second Example

In a case where the directions of the beams belonging to a subset of the beam group #1 and the directions of the beams belonging to the beam group #2 are identical to each other, the identicalness information can include information indicating a combination of subsets of the beam group #1, the combination being to be reported as a measurement result for each of the beam group #1 and the beam group #2. For example, it is assumed that the beam group #1 includes a plurality of subsets. In this case, the identicalness information includes information indicating a combination of subsets that is to be reported as the measurement result for the beam group #1, that is, a combination of all subsets of the beam group #1. Further, the identicalness information includes information indicating a combination of subsets that is to be reported as the measurement result for the beam group #2, that is, a combination of subsets of the beam group #1 that include beams of which directions are identical to those of the beam group #2.

The terminal device 200 (for example, the measurement reporting section 241) reports a measurement result for a subset of the beam group #1 on the basis of the identicalness information notified from the base station 100. For example, the terminal device 200 reports, as the measurement result for the beam group #1, a measurement result for the combination of all subsets belonging to the beam group #1. Furthermore, the terminal device 200 reports, as the measurement result for the beam group #2, a measurement result for the combination of subsets of the beam group #1 that include beams of which directions are identical to those of the beam group #2. In this way, the terminal device 200 can omit the measurement for the beam group #2, such that the burden is reduced. Further, the terminal device 200 originally does not have to receive the setting for the beam group #2. Hereinafter, this will be specifically described with reference to FIG. 12.

Figure 12:
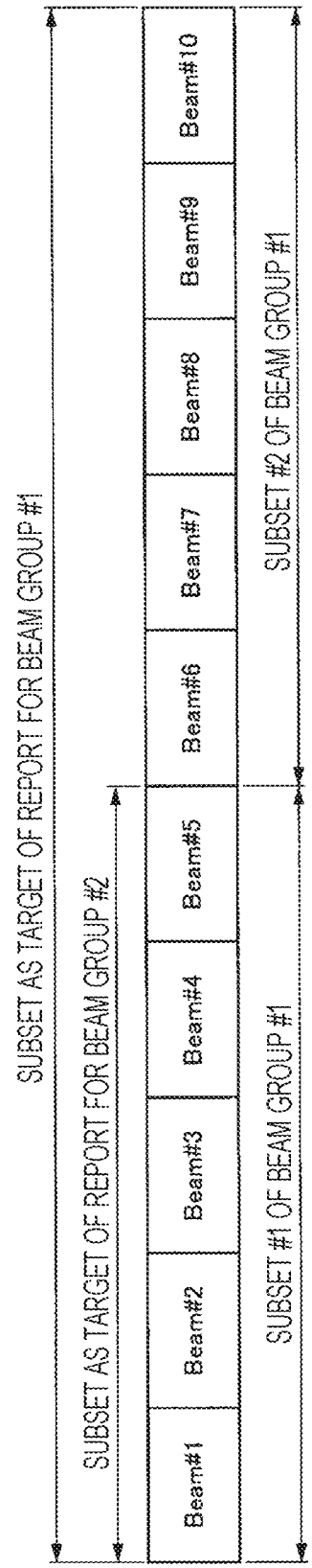
FIG. 12 is a diagram for describing an example of the identicalness information according to the embodiment.

FIG. 12 is a diagram for describing an example of the identicalness information according to the present embodiment. The second example of the setting information of the measurement report in the second specific example described above will be described with reference to FIG. 12. As illustrated in FIG. 12, the beam group #1 for the BWP #1 includes beams #1 to #10. Further, the beam group #1 for the BWP #1 includes a subset #1 including beams #1 to #5, and a subset #2 including beams #6 to #10. Further, a reporting target in the beam group #1 is a combination of the subsets #1 and #2. On the other hand, a reporting target in the beam group #2 is a subset #1.

The identicalness information includes setting information of a measurement report, the setting information indicating that the reporting target in the beam group #1 is a combination of the subsets #1 and #2. For example, the base station 100 notifies the terminal device 200 of information that sets a beam having maximum RSRP in the subsets #1 and #2 of the beam groups #1 to be reported as the measurement result for the beam group #1. Further, the terminal device 200 reports, to the base station 100, as the measurement result for the beam group #1, information indicating the beam having the maximum RSRP among the beams #1 to #10 belonging to the combination of the subsets #1 and #2 of the beam group #1.

On the other hand, the identicalness information includes setting information of a measurement report, the setting information indicating that the reporting target in the beam group #2 is the subset #1. For example, the base station 100 notifies the terminal device 200 of information that sets a beam having maximum RSRP in the subset #1 of the beam groups #1 to be reported as the measurement result for the beam group #2. Further, the terminal device 200 reports, to the base station 100, as the measurement result for the beam group #2, information indicating a beam having maximum RSRP among the beams #1 to #5 belonging to the subset #1 of the beam group #1.

Supplement

Note that a processing flow in a case where the identicalness information includes the setting information of the measurement report is similar to the processing flow described with reference to FIG. 9. However, the identicalness information transmitted in Step S106 includes information that sets the measurement result for the beam group #2 to be reported on the basis of the measurement result for the beam group #1.

4. SECOND EMBODIMENT

In the present embodiment, the beam sweeping is performed over a plurality of frequency bandwidths while switching a frequency bandwidth to be used.

4.1. Technical Problem

Even in a case of the terminal device 200 in which a plurality of frequency bandwidths is set, the number of frequency bandwidths that can be used at the same time may be limited due to the capability of the terminal device 200. For example, the number of frequency bandwidths that the terminal device 200 can use at the same time may be one. In this case, the terminal device 200 can transmit and receive a signal on a plurality of frequency bandwidths by switching a frequency bandwidth to be used. Similarly, the beam selection procedure can be performed while switching the frequency bandwidth to be used. This will be described with reference to FIG. 13.

Figure 13:
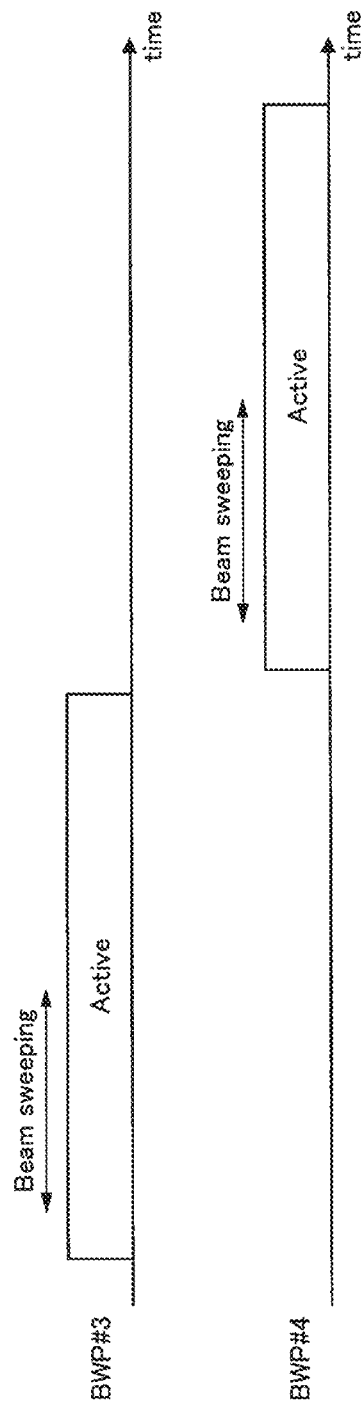
FIG. 13 is a diagram for describing a technical problem of a second embodiment.

FIG. 13 is a diagram for describing a technical problem of the present embodiment. As illustrated in FIG. 13, the beam sweeping is performed in a time zone where the BWP #3 is active, and then the beam sweeping is performed in a time zone where the BWP #4 is active. However, in a case where the active BWP is switched frequently, it may be difficult to complete the beam sweeping within a time in which one BWP is active. Note that the beam sweeping method illustrated in FIG. 13 is realized by 3GPP Rel 15.

4.2. Technical Features (1) Beam Sweeping Linkage Using a Plurality of Beam Groups The base station 100 (for example, the measurement signal transmitting section 155) according to the present embodiment replaces a part of the beam sweeping using a beam group defined in a certain frequency bandwidth with the beam sweeping using a beam group defined in another frequency bandwidth. This makes it possible to perform the beam sweeping over a plurality of BWPs while switching a BWP, even in a case where it is difficult to complete the beam sweeping within a time in which one BWP is active.

Note that the technical features of the present embodiment will be described using a third beam group defined in a third frequency bandwidth and a fourth beam group defined in a fourth frequency bandwidth. The third frequency bandwidth is also referred to as a BWP #3, the third beam group is also referred to as a beam group #3, the fourth frequency bandwidth is also referred to as a BWP #4, and the fourth beam group is also referred to as a beam group #4. It is assumed that directions of beams of the beam group #3 and directions of beams of the beam group #4 are at least partially identical to each other. In this case, in the beam sweeping using the beam group #3, the beam sweeping using beams identical to those of the beam group #4 is replaced with the beam sweeping using the beam group #4.

First, the base station 100 (for example, the measurement signal transmitting section 155) associates a subset of the beam group #3 with the beam group #4 including beams of which directions are identical to those of another subset of the beam group #3, or a subset of the beam group #4. Such an association is also referred to as linkage. Then, the base station 100 performs beam-sweeping transmission of a measurement signal by using the subset of the beam group #3 and the beam group #4 or the subset of the beam group #4 that are linked.

The base station 100 (for example, the notification section 153) notifies the terminal device 200 of information regarding the linkage as the identicalness information. The identicalness information includes information that sets a measurement result for the subset of the beam group #3 and a measurement result for beams belonging to the beam group #4 of which directions are identical to those of another subset of the beam group #3 to be associated with each other and reported. More specifically, the identicalness information includes information that sets a measurement result for a measurement signal transmitted using the subset of the beam group #3 and a measurement signal transmitted using the beams belonging to the beam group #4 of which directions are identical to those of beams belonging to another subset of the beam group #3 to be reported as a measurement result for the beam group #3. Note that the identicalness information includes at least information indicating the subset of the beam group #3, and the beam group #4 or the subset of the beam group #4 that are linked.

The terminal device 200 (for example, the measurement reporting section 241) associates a measurement result for a subset of the beam group #3 and a measurement result for the beams belonging to the beam group #4 of which directions are identical to those of the beams belonging to another subset of the beam group #3 with each other and reports them. More specifically, the terminal device 200 reports, as a measurement result for the beam group #3, a measurement result for a measurement signal transmitted using the subset of the beam group #3 and a measurement signal transmitted using the beams belonging to the beam group #4 of which directions are identical to those of beams belonging to another subset of the beam group #3.

Hereinafter, the beam sweeping linkage using a plurality of beam groups will be specifically described with reference to FIG. 14.

Figure 14:
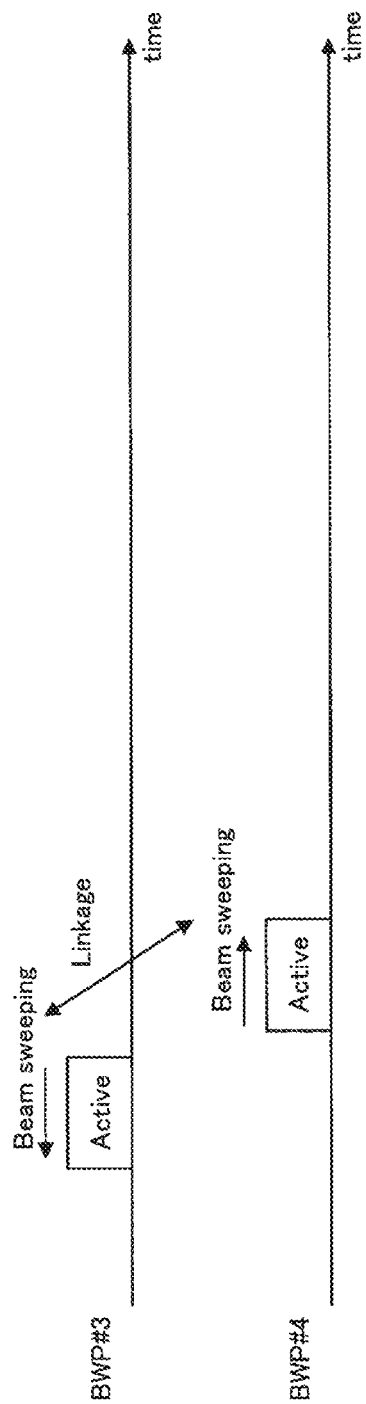
FIG. 14 is a diagram for describing an example of beam sweeping linkage using a plurality of beam groups according to the embodiment.

FIG. 14 is a diagram for describing an example of the beam sweeping linkage using a plurality of beam groups according to the present embodiment. It is assumed that the base station 100 can use the BWP #3 and the BWP #4, and the number of BWPs that the terminal device 200 can use at the same time is one. Further, it is assumed that the base station 100 can transmit the beam group #3 defined in the BWP #3 and can transmit the beam group #4 defined in the BWP #4. Further, the beam group #3 and the beam group #4 include the following beams, respectively.

Beam group #3:
Beam #1, Beam #2, . . . , and Beam #10
Beam group #4:
Beam #1, Beam #2, . . . , and Beam #10
Here, it is assumed that beams having the same index have the identical directivity.

The base station 100 links the subset of the beam group #3 with the subset of the beam group #4 that includes beams of which directions are identical to those of another subset of the beam group #3. For example, the base station 100 links the beams #1 to #5 belonging to the beam group #3 with the beams #6 to #10 belonging to the beam group #4. Next, the base station 100 notifies the terminal device 200 of information that sets measurement results for the respective linked subsets to be associated with each other and reported. Then, as illustrated in FIG. 14, the base station 100 performs beam-sweeping transmission of a measurement signal by using each of the linked subsets while switching from the BWP #3 to the BWP #4. For example, the base station 100 performs beam-sweeping transmission of a measurement signal by using the beams #1 to #5 belonging to the beam group #3 in a time zone where the BWP #3 is active. Next, the base station 100 performs beam-sweeping transmission of a measurement signal by using the beams #6 to #10 belonging to the beam group #4 in a time zone where the BWP #4 is active.

The terminal device 200 performs measurement for a measurement signal transmitted using the beams #1 to #5 belonging to the beam group #3 and a measurement signal transmitted using the beams #6 to #10 belonging to the beam group #4. Then, the terminal device 200 reports, to the base station 100, a measurement result therefor as a measurement result for the beam group #3. For example, the terminal device 200 reports, to the base station 100, a beam ID and an RSRP value of one beam having the highest RSRP or each of top K beams having high RSRP.

Note that in a case where the terminal device 200 reports one beam having the highest RSRP, it can be said that selection of a beam is performed by the terminal device 200. On the other hand, in a case where the terminal device 200 reports K beams having high RSRP, selection of a beam from the K beams is performed by the base station 100.

As described above, in the present embodiment, a part of the beam sweeping using the beam group #3 is replaced with the beam sweeping using the beam group #4. Therefore, it is possible to seamlessly perform the beam sweeping while switching a BWP, even in a case where it is difficult to complete the beam sweeping within a time in which one BWP is active.

(2) Processing Flow

Hereinafter, an example of a flow of the beam selection processing in the specific example described with reference to FIG. 14 will be described with reference to FIG. 15.

Figure 15:
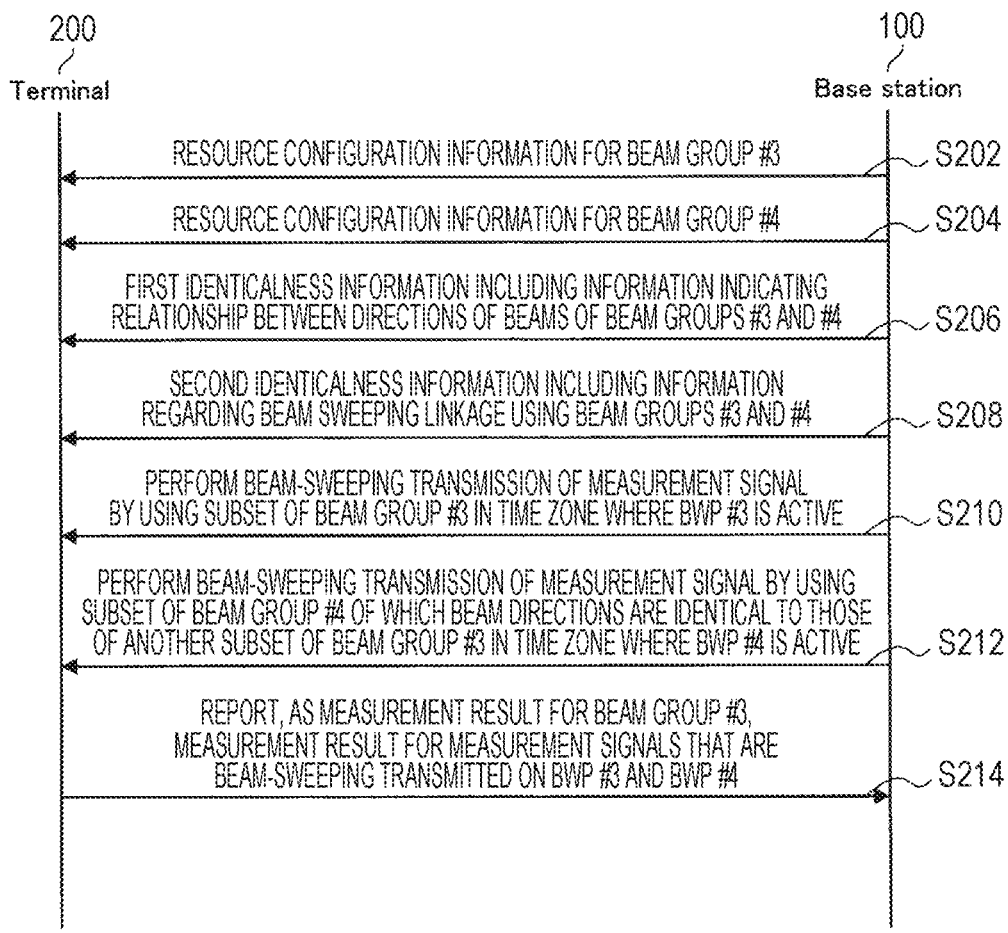
FIG. 15 is a sequence illustrating an example of a flow of beam selection processing performed by a system according to the embodiment.

FIG. 15 is a sequence illustrating an example of a flow of the beam selection processing performed by the system 1 according to the present embodiment. As illustrated in FIG. 15, the base station 100 and the terminal device 200 are involved in this sequence. First, the base station 100 transmits, to the terminal device 200, resource configuration information for the beam group #3 (Step S202). Further, the base station 100 transmits, to the terminal device 200, resource configuration for the beam group #4 (Step S204).

Next, the base station 100 transmits, to the terminal device 200, first identicalness information including information indicating a relationship between directions of beams of the beam groups #3 and #4 (Step S206). For example, the first identicalness information includes information indicating that directions of the beams belonging to the beam group #3 and directions of the beams belonging to the beam group #4 are identical to each other. Next, the base station 100 transmits, to the terminal device 200, second identicalness information including information regarding beam sweeping linkage using the beam groups #3 and #4 (Step S208). For example, the second identicalness information includes information that sets a measurement result for a subset of the beam group #3 and a measurement result for beams which belong to the beam group #4 and of which directions are identical to those of beams of another subset of the beam group #3 to be associated with each other and reported.

Next, the base station 100 performs beam-sweeping transmission of a measurement signal by using the subset of the beam group #3 in a time zone where the BWP #3 is active (Step S210). Next, the base station 100 performs beam-sweeping transmission of a measurement signal by using a subset of the beam group #4 including beams of which directions are identical to those of another subset of the beam group #3 in a time zone where the BWP #4 is active (S212). Then, the terminal device 200 reports, to the base station 100, a measurement result for the measurement signals that are beam-sweeping transmitted on the BWP #3 and BWP #4 as a measurement result for the beam group #3 (Step S214).

(3) Modified Example

Figure 16:
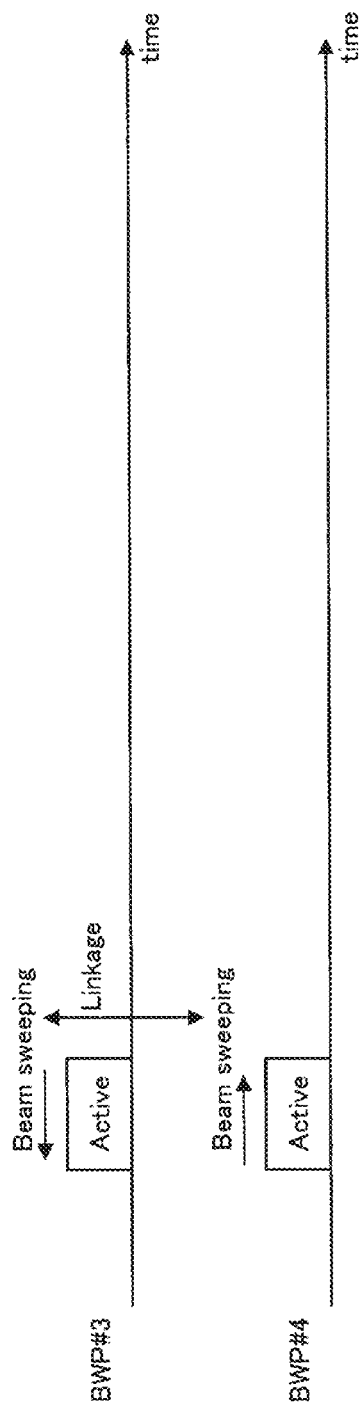
FIG. 16 is a diagram for describing another example of the beam sweeping linkage using a plurality of beam groups according to the embodiment.

FIG. 16 is a diagram for describing another example of the beam sweeping linkage using a plurality of beam groups according to the present embodiment. It is assumed that the base station 100 can use the BWP #3 and the BWP #4, and the number of BWPs that the terminal device 200 can use at the same time is two. Further, it is assumed that the base station 100 can transmit the beam group #3 defined in the BWP #3 and can transmit the beam group #4 defined in the BWP #4. Further, the beam group #3 and the beam group #4 include the following beams, respectively.

Beam group #3:
Beam #1, Beam #2, . . . , and Beam #10
Beam group #4:
Beam #1, Beam #2, . . . , and Beam #10
Here, it is assumed that beams having the same index have the identical directivity.

In the example illustrated in FIG. 16, the base station 100 simultaneously performs beam sweeping transmission of a measurement signal using a subset of the beam group #3 and a subset of the beam group #4 that are linked. That is, the base station 100 may simultaneously perform the beam sweeping using linked beam groups on a plurality of BWPs.

5. THIRD EMBODIMENT

In the present embodiment, the base station 100 evaluates identicalness of a plurality of uplink beam groups, and the terminal device 200 omits the beam sweeping using one of the plurality of beam groups that is evaluated to be identical.

5.1. Technical Problem

In the first embodiment and the second embodiment described above, the burden on the terminal device 200 in a case where a measurement signal is beam-sweeping transmitted in downlink and a downlink Tx beam is selected is reduced. Similarly, it is desirable to reduce the burden on the terminal device 200 in a case where a measurement signal is beam-sweeping transmitted in uplink and an uplink Tx beam is selected.

However, although it is possible for the base station 100 to determine whether or not directions of beams of a plurality of uplink beam groups defined in different frequency bandwidths are identical to each other, it is difficult for the terminal device 200 to determine the same.

5.2. Technical Features (1) Evaluation of Identicalness of Uplink Beam Groups The base station 100 (for example, the setting section 151) performs setting of beam groups defined in a plurality of frequency bandwidths, respectively. The beam group here is uplink Tx beams. For example, the base station 100 performs resource configuration for beam groups defined in the plurality of frequency bandwidths, respectively, and including a plurality of uplink Tx beams.

The technical features of the present embodiment will be described with reference to specific examples described below. For example, it is assumed that the terminal device 200 can transmit a beam group #5 (corresponding to a fifth beam group) defined in a BWP #5 (corresponding to a fifth frequency bandwidth). Further, it is assumed that the terminal device 200 can transmit a beam group #6 (corresponding to a sixth beam group) defined in a BWP #6 (corresponding to a sixth frequency bandwidth). Further, the beam group #5 and the beam group #6 include the following beams, respectively.

Beam group #5:
Beam #1, Beam #2, . . . , and Beam #10
Beam group #6:
Beam #1, Beam #2, . . . , and Beam #10
Here, it is assumed that beams having the same index have the identical directivity.

The base station 100 (for example, the notification section 153) notifies the terminal device 200 of the identicalness information including information that instructs to perform beam-sweeping transmission of a measurement signal using a plurality of uplink beam groups defined in a plurality of frequency bandwidths, respectively. For example, the base station 100 notifies the terminal device 200 of information that instructs to perform beam-sweeping transmission of a measurement signal using the beam group #5 and the beam group #6. Alternatively, for example, the base station 100 instructs the terminal device 200 to perform beam-sweeping transmission of a measurement signal using the beam group #5, and to perform beam-sweeping transmission of a measurement signal using the beam group #6.

The terminal device 200 (for example, the measurement signal transmitting section 243) performs beam-sweeping transmission of a measurement signal using a plurality of uplink beam groups defined in a plurality of frequency bandwidths, respectively, on the basis of the notification from the base station 100. For example, the terminal device 200 performs beam-sweeping transmission of a measurement signal using the beam group #5 and the beam group #6.

Then, the base station 100 (for example, the identicalness evaluation section 157) measures the measurement signal that is beam-sweeping transmitted by the terminal device 200 by using the plurality of uplink beam groups, and evaluates identicalness of the plurality of uplink beam groups. Specifically, the base station 100 determines whether or not directions of beams belonging to the beam group #5 and directions of beams belonging to the beam group #6 are identical to each other on the basis of a measurement result, and further specifies the identical beams. For example, in the specific example described above, the base station 100 determines that the directions of the beams belonging to the beam group #5 and the directions of the beams belonging to the beam group #6 are all identical to each other.

Thereafter, the base station 100 (for example, the notification section 153) notifies of information that designates an uplink beam group that is to be a target of the beam sweeping on the basis of an evaluation result. Hereinafter, an example of such information will be described.

The identicalness information includes information that instructs not to perform beam-sweeping transmission of a measurement signal using an uplink beam group defined in a specific frequency bandwidth. The uplink beam group defined in a specific frequency bandwidth here is a beam group including beams of which directions are identical to those of beams of another beam group, or to those of a subset of another beam group. For example, in the specific example described above, the identicalness information can include information that instructs not to perform beam-sweeping transmission of a measurement signal using the beam group #6. In this case, the identicalness information may be information that instructs to delete the resource configuration for the beam group #6.

Alternatively, the identicalness information includes information that instructs to perform beam-sweeping transmission of a measurement signal using an uplink beam group defined in a specific frequency bandwidth. The uplink beam group defined in a specific frequency bandwidth here is a beam group including beams of which directions are identical to those of beams of another beam group or including a subset that includes beams of which directions are identical to those of beams of another beam group. For example, in the specific example described above, the identicalness information can include information that instructs to perform beam-sweeping transmission of a measurement signal using the beam group #5.

As a result, the terminal device 200 (for example, the measurement signal transmitting section 243) does not perform beam-sweeping transmission of a measurement signal using some of uplink beam groups defined in a plurality of frequency bandwidths, respectively, but performs beam-sweeping transmission of a measurement signal using another uplink beam group. For example, in the specific example described above, the terminal device 200 does not perform beam-sweeping transmission of a measurement signal using the beam group #6, but performs beam-sweeping transmission of a measurement signal using the beam group #5. Since the directions of the beams of the beam group #5 are identical to those of the beam group #6, the base station 100 can handle a measurement result for the beam group #5 as measurement result for the beam group #6. That is, the base station 100 can omit measurement for the beam group #6. In addition, the terminal device 200 can omit beam-sweeping transmission of a measurement signal using the beam group #6. Therefore, the burden on both the base station 100 and the terminal device 200 is reduced.

(2) Processing Flow

Hereinafter, an example of a flow of the beam selection processing in the specific example described above will be described with reference to FIG. 17.

Figure 17:
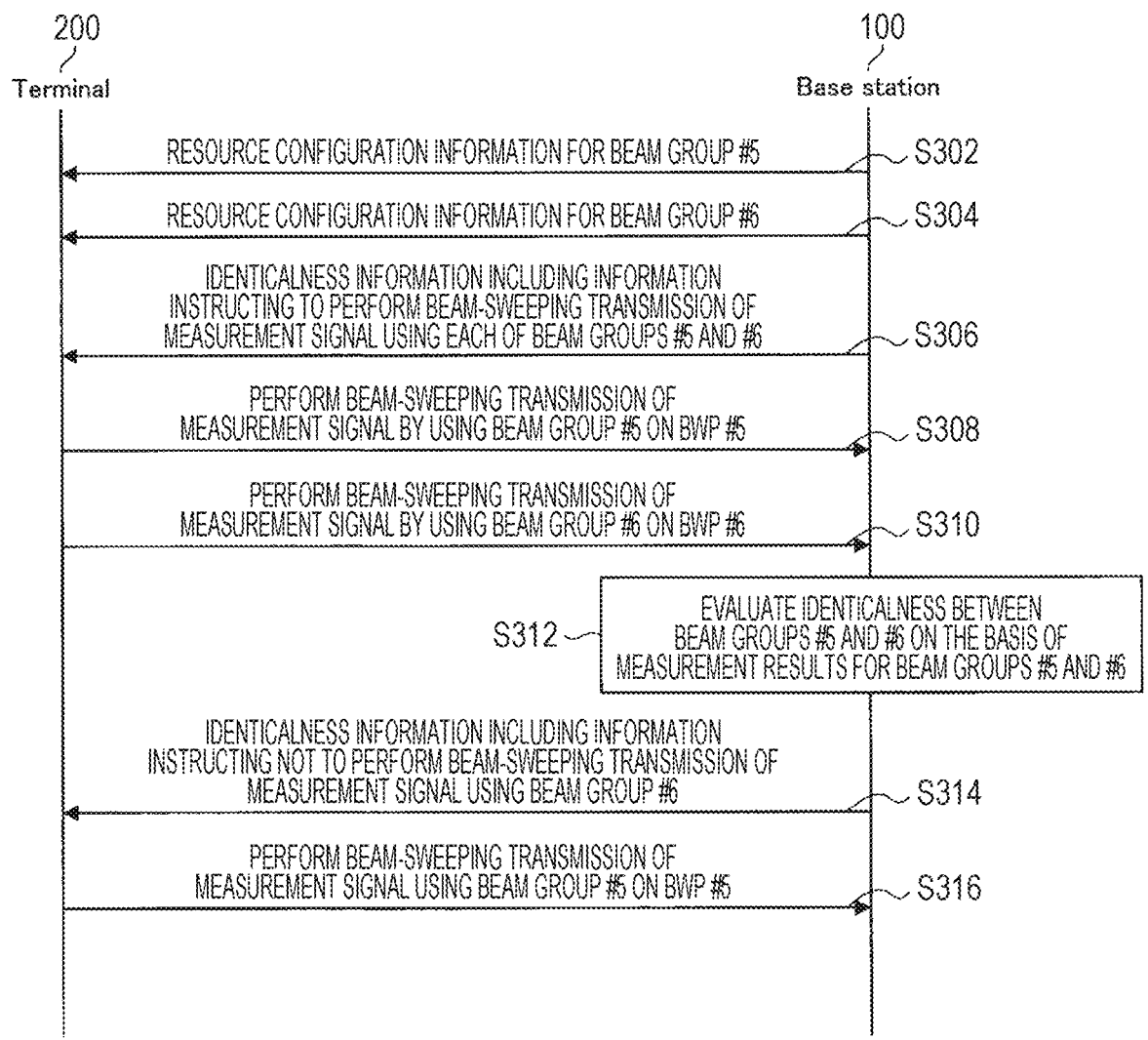
FIG. 17 is a sequence illustrating an example of a flow of beam selection processing performed by a system according to a third embodiment.

FIG. 17 is a sequence illustrating an example of a flow of the beam selection processing performed by the system 1 according to the present embodiment. As illustrated in FIG. 17, the base station 100 and the terminal device 200 are involved in this sequence. First, the base station 100 transmits, to the terminal device 200, resource configuration information for the beam group #5 (Step S302). Further, the base station 100 transmits, to the terminal device 200, resource configuration for the beam group #6 (Step S304).

Next, the base station 100 transmits, to the terminal device 200, the identicalness information including information that instructs to perform beam-sweeping transmission of a measurement signal using each of the beam groups #5 and #6 (Step S306). Next, the terminal device 200 performs beam-sweeping transmission of a measurement signal by using the beam group #5 on the BWP #5 (Step S308). Further, the terminal device 200 performs beam-sweeping transmission of a measurement signal by using the beam group #6 on the BWP #6 (Step S310).

Then, the base station 100 measures the measurement signal that is beam-sweeping transmitted using each of the beam groups #5 and #6, and evaluates the identicalness of the beam groups #5 and #6 on the basis of a measurement result (Step S312). Here, it is assumed that directions of beams of the beam groups #5 and #6 are determined to be identical to each other.

Next, the base station 100 transmits, to the terminal device 200, the identicalness information including information that instructs not to perform beam-sweeping transmission of a measurement signal using the beam group #6 (Step S314). The identicalness information here may be information that instructs to delete the resource configuration for the beam group #6. Alternatively, the identicalness information here may include information that instructs to perform beam-sweeping transmission of a measurement signal using the beam group #5. Then, the terminal device 200 performs beam-sweeping transmission of a measurement signal using the beam group #5 on the BWP #5 on the basis of the identicalness information (Step S316).

6. APPLICATION EXAMPLE

The technology according to the present disclosure can be applied to various products.

For example, the base station 100 may be realized as any kind of evolved Node B (eNB) such as a macro eNB or a small eNB. The small eNB may be an eNB that covers a cell smaller than a macrocell, such as a pico eNB, a micro eNB, or a home (femto) eNB. Alternatively, the base station 100 may be realized as another type of base station such as a NodeB or a base transceiver station (BTS). The base station 100 may include a main body (also referred to as a base station device) that controls wireless communication, and one or more remote radio heads (RRHs) that are arranged at a location different from that of the main body. Further, various types of terminals as described later may be operated as the base station 100 by temporarily or semi-permanently executing the base station function.

Further, for example, the terminal device 200 may be implemented as a smartphone, a tablet personal computer (PC), a notebook PC, a portable game terminal, a mobile terminal such as a portable/dongle type mobile router, a digital camera, or the like, or an in-vehicle terminal such as a car navigation device. Further, the terminal device 200 may be realized as a terminal (also referred to as a machine type communication (MTC) terminal) that performs machine to machine (M2M) communication. Moreover, the terminal device 200 may be a wireless communication module (for example, an integrated circuit module configured with one die) mounted on these terminals.

6.1. Application Example Related to Base Station

First Application Example

Figure 18:
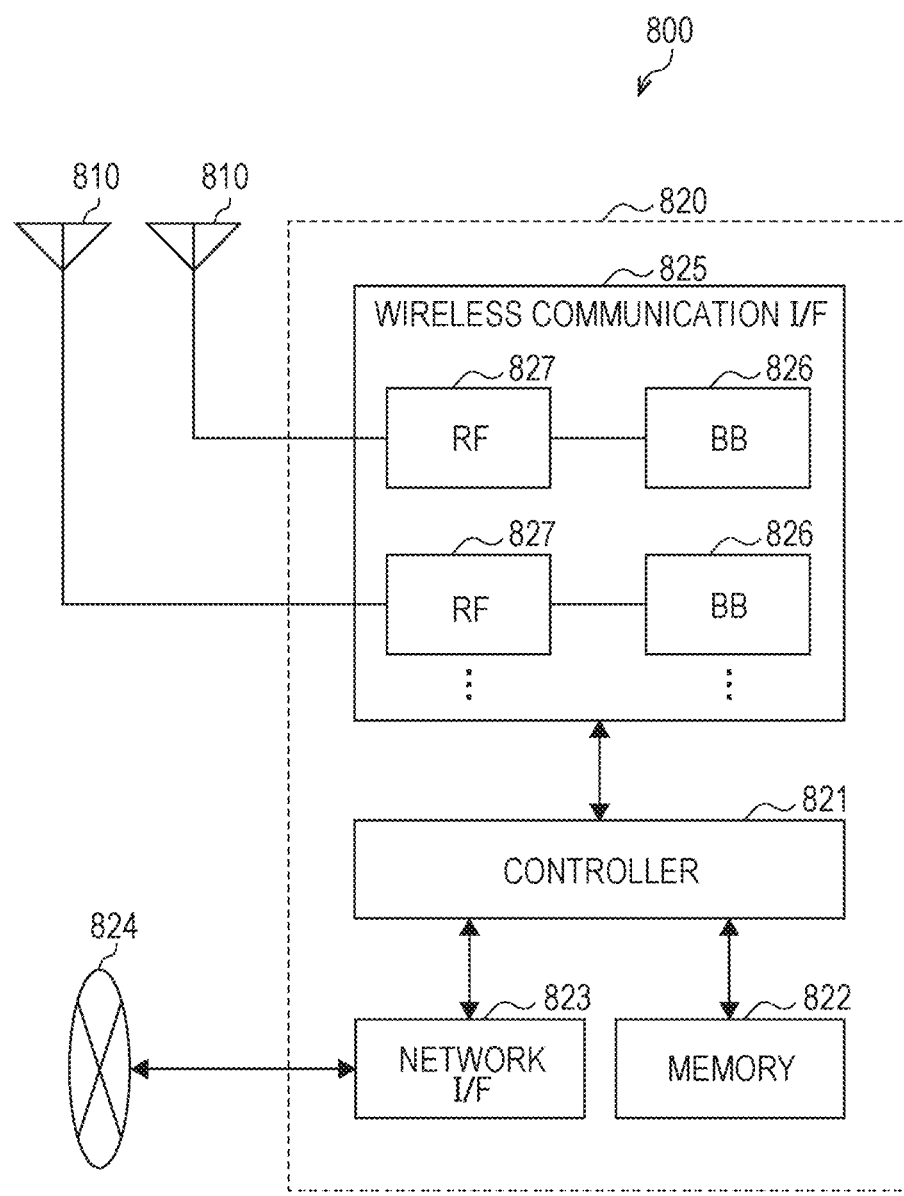
FIG. 18 is a block diagram illustrating a first example of a schematic configuration of an eNB.

FIG. 18 is a block diagram illustrating a first example of a schematic configuration of an eNB to which the technology according to the present disclosure can be applied. An eNB 800 includes one or more antennas 810 and a base station device 820. Each antenna 810 and the base station device 820 can be connected to each other via an RF cable.

Each of the antennas 810 includes a single or multiple antenna elements (for example, a plurality of antenna elements constituting a MIMO antenna) and is used for transmission and reception of a wireless signal by the base station device 820. The eNB 800 includes a plurality of antennas 810 as illustrated in FIG. 18, and the plurality of antennas 810 may correspond to, for example, a plurality of frequency bands used by the eNB 800, respectively. Note that although FIG. 18 illustrates an example in which the eNB 800 includes a plurality of antennas 810, the eNB 800 may include a single antenna 810.

The base station device 820 includes a controller 821, a memory 822, a network interface 823, and a wireless communication interface 825.

The controller 821 may be, for example, a central processing unit (CPU) or a digital signal processor (DSP), and perform a control to operate various functions of the upper layer of the base station device 820. For example, the controller 821 generates a data packet from data in a signal processed by the wireless communication interface 825 and forwards the generated packet via the network interface 823. The controller 821 may generate a bundled packet by bundling data from a plurality of baseband processors and forward the generated bundled packet. In addition, the controller 821 may have logical functions of performing a control such as a radio resource control, a radio bearer control, mobility management, an admission control, scheduling, or the like. Further, the control may be performed in cooperation with the surrounding eNB or the core network node. The memory 822 includes a random access memory (RAM) and a read only memory (ROM), and stores a program executed by the controller 821 and various control data (for example, a terminal list, transmission power data, scheduling data, and the like).

The network interface 823 is a communication interface for connecting the base station device 820 to a core network 824. The controller 821 may perform communication with a core network node or another eNB via the network interface 823. In that case, the eNB 800, and the core network node or another eNB may be connected to each other by a logical interface (for example, an S1 interface or X2 interface). The network interface 823 may be a wired communication interface or a wireless communication interface for a wireless backhaul. In a case where the network interface 823 is a wireless communication interface, the network interface 823 may use, for wireless communication, a frequency band higher than a frequency band used by the wireless communication interface 825.

The wireless communication interface 825 supports any one of cellular communication schemes such as long term evolution (LTE), LTE-Advanced, or the like, and provides wireless connection to a terminal located in a cell of the eNB 800 via the antenna 810. The wireless communication interface 825 may typically include a baseband (BB) processor 826, an RF circuit 827, and the like. The BB processor 826 may perform, for example, encoding/decoding, modulation/demodulation, multiplexing/demultiplexing, and the like, and may perform various signal processing of each layer (for example, L1, medium access control (MAC), radio link control (RLC), and packet data convergence protocol (PDCP)). Instead of the controller 821, the BB processor 826 may have some or all of the above-described logical functions. The BB processor 826 may be a module including a memory that stores a communication control program, a processor that executes the program, and a related circuit, and the functions of the BB processor 826 may be changed by updating the above-described program. Further, the above-described module may be a card or a blade to be inserted into a slot of the base station device 820, or may be a chip mounted on the card or the blade. Meanwhile, the RF circuit 827 may include a mixer, a filter, an amplifier, and the like, and transmits and receives a wireless signal via the antenna 810.

The wireless communication interface 825 includes a plurality of BB processors 826 as illustrated in FIG. 18, and the plurality of BB processors 826 may correspond to, for example, a plurality of frequency bands used by the eNB 800, respectively. Further, the wireless communication interface 825 includes a plurality of RF circuits 827 as illustrated in FIG. 18, and the plurality of RF circuits 827 may correspond to, for example, a plurality of antenna elements, respectively. Note that although FIG. 18 illustrates an example in which the wireless communication interface 825 includes a plurality of BB processors 826 and a plurality of RF circuits 827, the wireless communication interface 825 may include a single BB processor 826 or a single RF circuit 827.

In the eNB 800 illustrated in FIG. 18, one or more constituent elements (for example, the setting section 151, the notification section 153, the measurement signal transmitting section 155, and/or the identicalness evaluation section 157) included in the control section 150 described with reference to FIG. 5 may be implemented in the wireless communication interface 825. Alternatively, at least some of these constituent elements may be implemented in the controller 821. As an example, the eNB 800 may be mounted with a module including a part (for example, the BB processor 826) of or the entire wireless communication interface 825 and/or the controller 821, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the eNB 800, and the wireless communication interface 825 (for example, the BB processor 826) and/or the controller 821 may execute the program. As described above, the eNB 800, the base station device 820, or the above-described module may be provided as a device including the one or more constituent elements described above, and a program for causing a processor to function as the one or more constituent elements described above may be provided. Further, a readable recording medium on which the above-described program is recorded may be provided.

Further, in the eNB 800 illustrated in FIG. 18, the wireless communication section 120 described with reference to FIG. 5 may be implemented in the wireless communication interface 825 (for example, the RF circuit 827). Further, the antenna section 110 may be implemented in the antenna 810. Further, the network communication section 130 may be implemented in the controller 821 and/or the network interface 823. Further, the storage section 140 may be implemented in the memory 822.

Second Application Example

Figure 19:
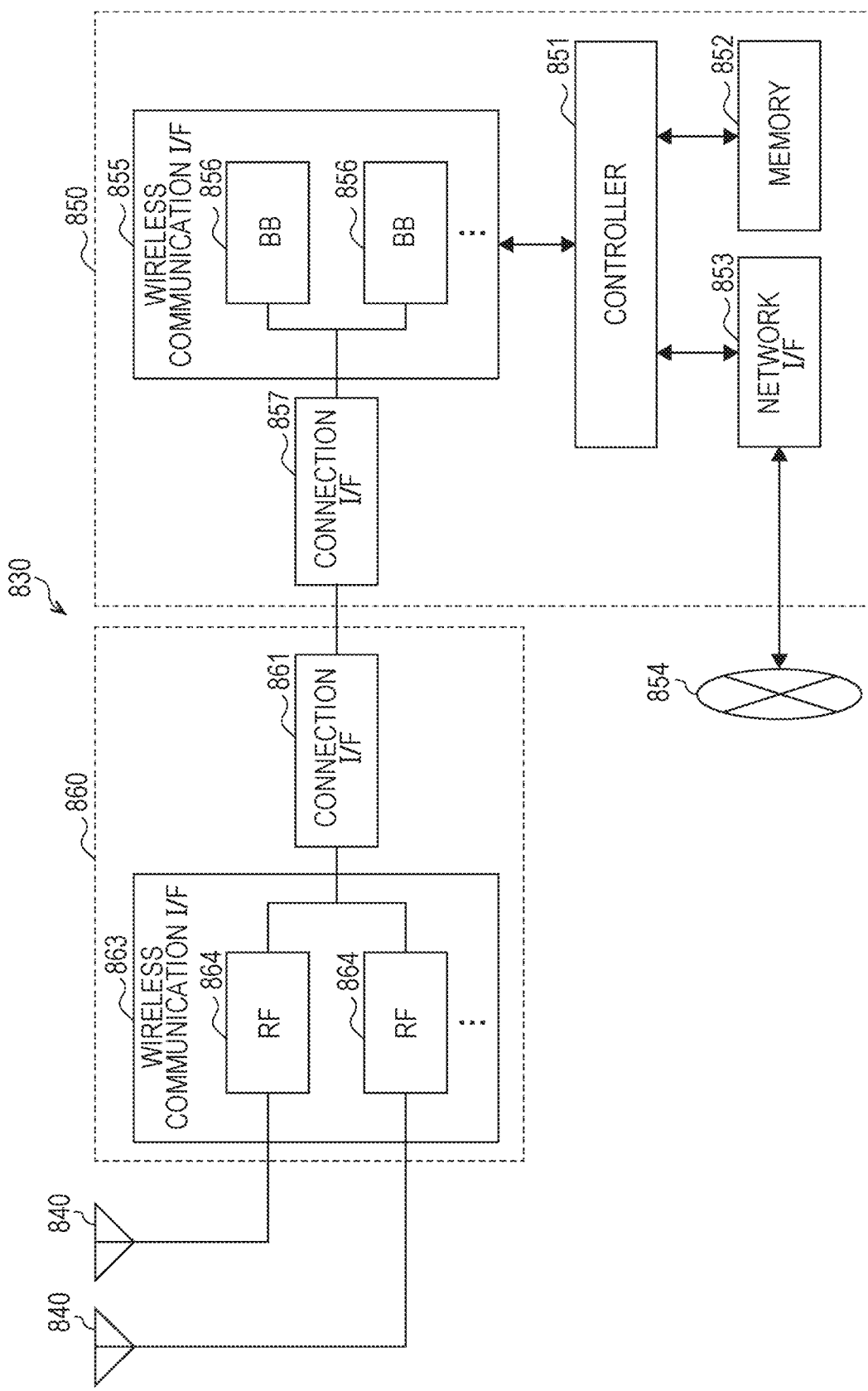
FIG. 19 is a block diagram illustrating a second example of the schematic configuration of the eNB.

FIG. 19 is a block diagram illustrating a second example of a schematic configuration of an eNB to which the technology according to the present disclosure can be applied. An eNB 830 includes one or more antennas 840, a base station device 850, and an RRH 860. Each antenna 840 and the RRH 860 may be connected to each other via an RF cable. Further, the base station device 850 and the RRH 860 can be connected to each other by a high-speed line such as an optical fiber cable.

Each of the antennas 840 includes a single or multiple antenna elements (for example, a plurality of antenna elements constituting a MIMO antenna) and is used for transmission and reception of a wireless signal by the RRH 860. The eNB 830 includes a plurality of antennas 840 as illustrated in FIG. 19, and the plurality of antennas 840 may correspond to, for example, a plurality of frequency bands used by the eNB 830, respectively. Note that although FIG. 19 illustrates an example in which the eNB 830 includes a plurality of antennas 840, the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 18.

The wireless communication interface 855 supports any one of cellular communication schemes such as LTE, LTE-Advanced, or the like, and provides wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 18, except that the BB processor 856 is connected to an RF circuit 864 of the RRH 860 via the connection interface 857. The wireless communication interface 855 includes a plurality of BB processors 856 as illustrated in FIG. 19, and the plurality of BB processors 856 may correspond to, for example, a plurality of frequency bands used by the eNB 830, respectively. Note that although FIG. 19 illustrates an example in which the wireless communication interface 855 includes a plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the above-described high-speed line connecting the base station device 850 (wireless communication interface 855) and the RRH 860 to each other.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the above-described high-speed line.

The wireless communication interface 863 transmits and receives a wireless signal via the antenna 840. The wireless communication interface 863 may typically include an RF circuit 864 and the like. The RF circuit 864 may include a mixer, a filter, an amplifier, and the like, and transmits and receives a wireless signal via the antenna 840. The wireless communication interface 863 includes a plurality of RF circuits 864 as illustrated in FIG. 19, and the plurality of RF circuits 864 may correspond to, for example, a plurality of antenna elements, respectively. Note that although FIG. 19 illustrates an example in which the wireless communication interface 863 includes a plurality of RF circuits 864, the wireless communication interface 863 may include a single RF circuit 864.

In the eNB 830 illustrated in FIG. 19, one or more constituent elements (for example, the setting section 151, the notification section 153, the measurement signal transmitting section 155, and/or the identicalness evaluation section 157) included in the control section 150 described with reference to FIG. 5 may be implemented in the wireless communication interface 855 and/or wireless communication interface 863. Alternatively, at least some of these constituent elements may be implemented in the controller 851. As an example, the eNB 830 may be mounted with a module including a part (for example, the BB processor 856) of or the entire wireless communication interface 855 and/or the controller 851, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the eNB 830, and the wireless communication interface 855 (for example, the BB processor 856) and/or the controller 851 may execute the program. As described above, the eNB 830, the base station device 850, or the above-described module may be provided as a device including the one or more constituent elements described above, and a program for causing a processor to function as the one or more constituent elements described above may be provided. Further, a readable recording medium on which the above-described program is recorded may be provided.

Further, in the eNB 830 illustrated in FIG. 19, for example, the wireless communication section 120 described with reference to FIG. 5 may be implemented in the wireless communication interface 863 (for example, the RF circuit 864). Further, the antenna section 110 may be implemented in the antenna 840. Further, the network communication section 130 may be implemented in the controller 851 and/or the network interface 853. Further, the storage section 140 may be implemented in the memory 852.

6.2. Application Example Related to Terminal Device

First Application Example

Figure 20:
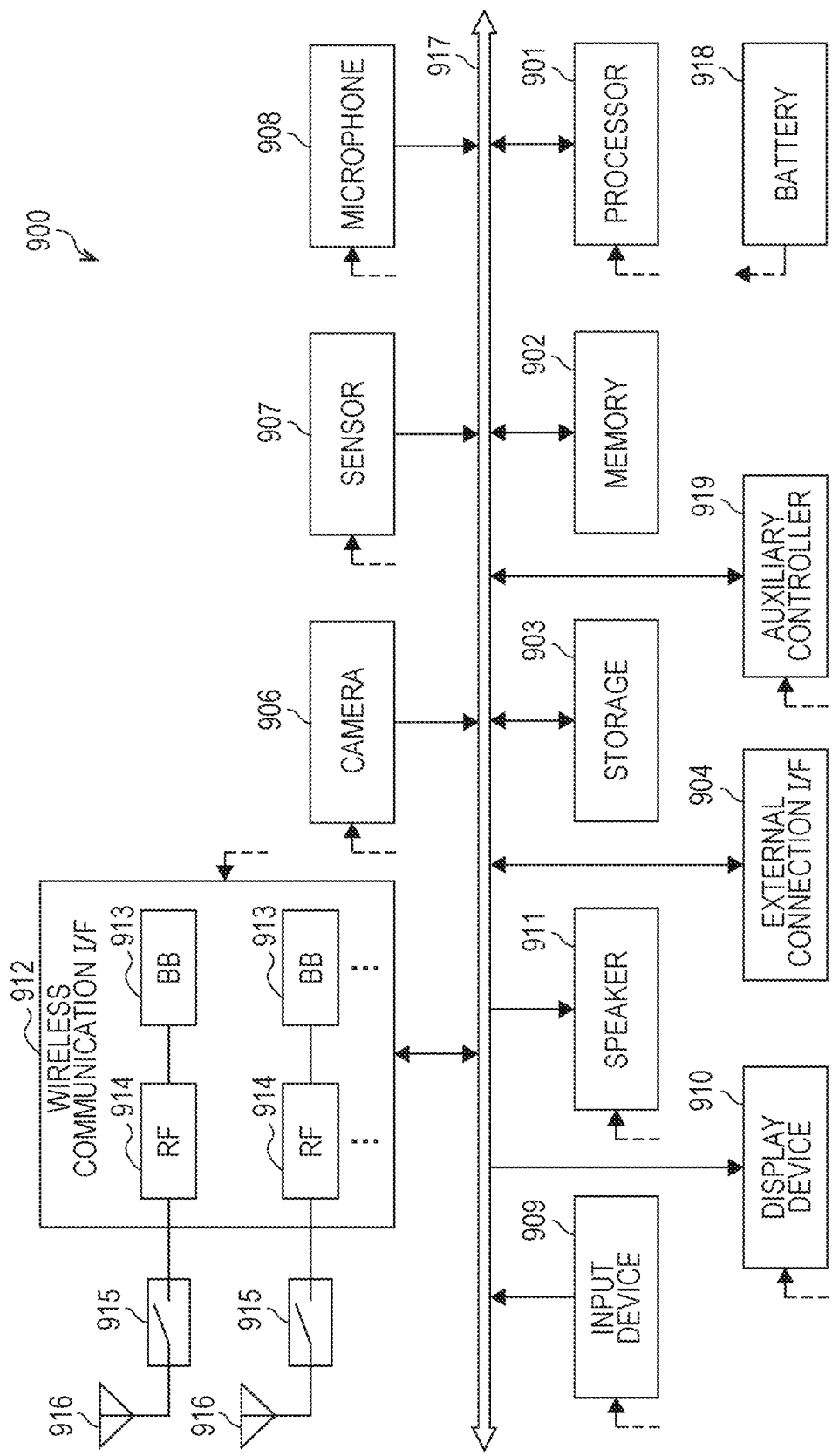
FIG. 20 is a block diagram illustrating an example of a schematic configuration of a smartphone.

FIG. 20 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM and stores a program executed by the processor 901 and data. The storage 903 can include a storage medium such as a semiconductor memory or a hard disk. The external connection interface 904 is an interface for connecting an externally attached device such as a memory card, a universal serial bus (USB) device, or the like to the smartphone 900.

The camera 906 includes, for example, an image capturing element such as a charge coupled device (CCD), a complementary metal oxide semiconductor (CMOS), or the like, and generates a captured image. The sensor 907 can include, for example, a group of sensors such as a positioning sensor, a gyro sensor, a geomagnetic sensor, an acceleration sensor, and the like. The microphone 908 converts sound input to the smartphone 900 into a sound signal. The input device 909 includes, for example, a touch sensor that detects a touch on a screen of the display device 910, a keypad, a keyboard, a button, a switch, or the like, and receives a manipulation or information input from the user. The display device 910 includes a screen such as a liquid crystal display (LCD), an organic light emitting diode (OLED) display, or the like, and displays an output image of the smartphone 900. The speaker 911 converts the sound signal output from the smartphone 900 into sound.

The wireless communication interface 912 supports any cellular communication scheme such as LTE or LTE-Advanced and performs wireless communication. The wireless communication interface 912 can typically include a BB processor 913, an RF circuit 914, and the like. The BB processor 913 may perform, for example, encoding/decoding, modulation/demodulation, multiplexing/demultiplexing, and the like, and performs various signal processing for wireless communication. Meanwhile, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 20. Note that although FIG. 20 illustrates an example in which the wireless communication interface 912 includes a plurality of BB processors 913 and a plurality of RF circuits 914, the wireless communication interface 912 may include a single BB processor 913 or a single RF circuit 914.

Moreover, the wireless communication interface 912 may support another type of wireless communication scheme such as a short-range wireless communication scheme, a near field wireless communication scheme, a wireless local area network (LAN) scheme, or the like, in addition to the cellular communication scheme. In that case, the wireless communication interface 912 may include the BB processor 913 and the RF circuit 914 for each wireless communication scheme.

Each of the antenna switches 915 switches a connection destination of the antenna 916 between a plurality of circuits (for example, circuits for different wireless communication schemes) included in the wireless communication interface 912.

Each of the antennas 916 includes a single or multiple antenna elements (for example, a plurality of antenna elements constituting a MIMO antenna) and is used for transmission and reception of a wireless signal by the wireless communication interface 912. The smartphone 900 may include a plurality of antennas 916 as illustrated in FIG. 20. Note that although FIG. 20 illustrates an example in which the smartphone 900 includes a plurality of antennas 916, the smartphone 900 may include a single antenna 916.

Moreover, the smartphone 900 may include the antenna 916 for each wireless communication scheme. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to one another. The battery 918 supplies power to each block of the smartphone 900 illustrated in FIG. 20 via a power supply line partially indicated by the broken line in FIG. 20. The auxiliary controller 919 performs control to operate minimum necessary functions of the smartphone 900, for example, in a sleep mode.

In the smartphone 900 illustrated in FIG. 20, one or more constituent elements (for example, the measurement reporting section 241 and/or the measurement signal transmitting section 243) included in the control section 240 described with reference to FIG. 6 may be implemented in the wireless communication interface 912. Alternatively, at least some of these constituent elements may be implemented in the processor 901 or the auxiliary controller 919. As an example, the smartphone 900 may be mounted with a module including a part (for example, the BB processor 913) of or the entire wireless communication interface 912, the processor 901, and/or the auxiliary controller 919, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the smartphone 900, and the wireless communication interface 912 (for example, the BB processor 913), the processor 901, and/or the auxiliary controller 919 may execute the program. As described above, the smartphone 900 or the above-described module may be provided as a device including the one or more constituent elements described above, and a program for causing a processor to function as the one or more constituent elements described above may be provided. Further, a readable recording medium on which the above-described program is recorded may be provided.

Further, in the smartphone 900 illustrated in FIG. 20, for example, the wireless communication section 220 described with reference to FIG. 6 may be implemented in the wireless communication interface 912 (for example, the RF circuit 914). Further, the antenna section 210 may be implemented in the antenna 916. Further, the storage section 230 may be implemented in the memory 902.

Second Application Example

FIG. 21 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM and stores a program executed by the processor 921 and data.

The GPS module 924 uses a GPS signal received from a GPS satellite to measure a location (for example, latitude, longitude, and altitude) of the car navigation device 920. The sensor 925 can include, for example, a group of sensors such as a gyro sensor, a geomagnetic sensor, an atmospheric pressure sensor, and the like. The data interface 926 is connected to an in-vehicle network 941 via a terminal (not illustrated), for example, and acquires data generated in a vehicle side, such as vehicle speed data or the like.

The content player 927 plays a content stored in a storage medium (for example, a CD or a DVD) to be inserted into the storage medium interface 928. The input device 929 includes, for example, a touch sensor that detects a touch on a screen of the display device 930, a button, a switch, or the like, and receives a manipulation or information input from the user. The display device 930 includes a screen such as an LCD, an OLED display, or the like and displays the navigation function or an image of a content to be played. The speaker 931 outputs sound of the navigation function or a content to be played.

The wireless communication interface 933 supports any cellular communication scheme such as LTE or LTE-Advanced and performs wireless communication. The wireless communication interface 933 can typically include a BB processor 934, an RF circuit 935, and the like. The BB processor 934 may perform, for example, encoding/decoding, modulation/demodulation, multiplexing/demultiplexing, and the like, and performs various signal processing for wireless communication. Meanwhile, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 21. Note that although FIG. 21 illustrates an example in which the wireless communication interface 933 includes a plurality of BB processors 934 and a plurality of RF circuits 935, the wireless communication interface 933 may include a single BB processor 934 or a single RF circuit 935.

Moreover, the wireless communication interface 933 may support another type of wireless communication scheme such as a short-range wireless communication scheme, a near field wireless communication scheme, a wireless LAN scheme, or the like, in addition to the cellular communication scheme. In that case, the wireless communication interface 933 may include the BB processor 934 and the RF circuit 935 for each wireless communication scheme.

Each of the antenna switches 936 switches a connection destination of the antenna 937 between a plurality of circuits (for example, circuits for different wireless communication schemes) included in the wireless communication interface 933.

Each of the antennas 937 includes a single or multiple antenna elements (for example, a plurality of antenna elements constituting a MIMO antenna) and is used for transmission and reception of a wireless signal by the wireless communication interface 933. The car navigation device 920 may include a plurality of antennas 937 as illustrated in FIG. 21. Note that although FIG. 21 illustrates an example in which the car navigation device 920 includes a plurality of antennas 937, the car navigation device 920 may include a single antenna 937.

Moreover, the car navigation device 920 may include the antenna 937 for each wireless communication scheme. In that case, the antenna switch 936 may be omitted from the configuration of the car navigation device 920.

The battery 938 supplies power to each block of the car navigation device 920 illustrated in FIG. 21 via a power supply line partially indicated by the broken line in FIG. 21. In addition, the battery 938 accumulates power supplied from the vehicle side.

In the car navigation device 920 illustrated in FIG. 21, one or more constituent elements (for example, the measurement reporting section 241 and/or the measurement signal transmitting section 243) included in the control section 240 described with reference to FIG. 6 may be implemented in the wireless communication interface 933. Alternatively, at least some of these constituent elements may be implemented in the processor 921. As an example, the car navigation device 920 may be mounted with a module including a part (for example, the BB processor 934) of or the entire wireless communication interface 933 and/or the processor 921, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the car navigation device 920, and the wireless communication interface 933 (for example, the BB processor 934) and/or the processor 921 may execute the program. As described above, the car navigation device 920 or the above-described module may be provided as a device including the one or more constituent elements described above, and a program for causing a processor to function as the one or more constituent elements described above may be provided. Further, a readable recording medium on which the above-described program is recorded may be provided.

Further, in the car navigation device 920 illustrated in FIG. 21, for example, the wireless communication section 220 described with reference to FIG. 6 may be implemented in the wireless communication interface 933 (for example, the RF circuit 935). Further, the antenna section 210 may be implemented in the antenna 937. Further, the storage section 230 may be implemented in the memory 922.

Further, the technology according to the present disclosure may be realized as an in-vehicle system (or vehicle) 940 including one or more blocks of the car navigation device 920 described above, the in-vehicle network 941, and a vehicle-side module 942. The vehicle-side module 942 generates vehicle-side data such as a vehicle speed, an engine RPM, failure information, and the like and outputs the generated data to the in-vehicle network 941.

7. CONCLUSION

Hereinabove, embodiments of the present disclosure have been described in detail with reference to FIGS. 1 to 21. As described above, the base station 100 according to the present embodiment performs setting of beam groups defined in a plurality of frequency bandwidths, respectively, and notifies the terminal device 200 of information regarding identicalness between the beam groups defined in the frequency bandwidths different from each other. The terminal device 200 can omit measurement for an identical beam among a plurality of beam groups on the basis of the information regarding the identicalness between the beam groups, the information being notified from the base station 100. For example, it is assumed that the directions of the beams belonging to the beam group #1 or a subset of the beam group #1 and the directions of the beams belonging to the beam group #2 are identical to each other. In this case, the terminal device 200 reports, to the base station 100, a measurement result of a measurement signal that is beam-sweeping transmitted by using the beam group #1 or a subset of the beam group #1 as a measurement result of a measurement signal that is beam-sweeping transmitted by using the beam group #2. In this way, since the terminal device 200 can omit measurement for an identical beam, the load on the terminal device 200 is reduced. That is, the amount of calculation of the terminal device 200 in the beam selection procedure is reduced, such that power consumption is reduced. In addition, the throughput of the terminal device 200 can be improved.

Moreover, the base station 100 may omit transmission of a measurement signal using a beam that is identical to a beam belonging to another beam group, among beams belonging to a plurality of beam groups. For example, it is assumed that the directions of the beams belonging to the beam group #1 or a subset of the beam group #1 and the directions of the beams belonging to the beam group #2 are identical to each other. In this case, the base station 100 may omit beam-sweeping transmission of a measurement signal using the beam group #2. In this case, a wireless resource for beam-sweeping transmission of a measurement signal using the beam group #2 can be released, such that the resource efficiency can be improved.

Hereinabove, the preferred embodiment of the present disclosure has been described in detail with reference to the accompanying drawings, but the technical scope of the present disclosure is not limited to such examples. It is obvious that those having ordinary knowledge in the technical field of the present disclosure can conceive of various modifications or alterations within the scope of the technical idea described in the claims, and it is understood that the modifications or alterations naturally fall within the technical scope of the present disclosure.

For example, in the above-described embodiments, a case where a plurality of frequency bandwidths is a plurality of BWPs has been mainly described, but the present technology is not limited to such an example. For example, the plurality of frequency bandwidths may be a plurality of CCs. That is, a BWP in the description of each of the above-described embodiments described above may also be read as a CC.

In addition, the processing described in the present specification using the flowchart and the sequence diagram does not necessarily have to be performed in the illustrated order. Some processing steps may be performed in parallel. Further, additional processing steps may be adopted, and some processing steps may be omitted.

Furthermore, the effects described in the present specification are merely illustrative or exemplary, and not limiting. That is, the technology according to the present disclosure may achieve other effects apparent to those skilled in the art from the description of the present specification, in addition to or instead of the effects described above.

Note that the following configurations also fall within the technical scope of the present disclosure.

(1)

A communication device including:

a setting section that performs setting of beam groups defined in a plurality of frequency bandwidths, respectively; and a notification section that notifies a terminal device of information regarding identicalness between the beam groups defined in the frequency bandwidths different from each other.

(2)

The communication device according to (1), in which the information regarding the identicalness includes information indicating whether or not a characteristic regarding a beam direction is identical between a plurality of the beam groups.

(3)

The communication device according to (2), in which the information regarding the identicalness includes information indicating that directions of beams belonging to a first beam group defined in a first frequency bandwidth and directions of beams belonging to a second beam group defined in a second frequency bandwidth are at least partially identical to each other.

(4)

The communication device according to (3), in which the information regarding the identicalness includes information indicating that directions of beams belonging to a subset of the first beam group and directions of the beams belonging to the second beam group are identical to each other.

(5)

The communication device according to any one of (1) to (4), in which the information regarding the identicalness includes information that sets a measurement result for the second beam group to be reported on the basis of a measurement result for the first beam group.

(6)

The communication device according to (5), in which the information regarding the identicalness includes information indicating a range of the beams belonging to the first beam group, the range being to be reported as a measurement result for each of the first beam group and the second beam group.

(7)

The communication device according to (5), in which the first beam group includes a plurality of subsets, and the information regarding the identicalness includes information indicating a combination of subsets of the first beam group, the combination being to be reported as a measurement result for each of the first beam group and the second beam group.

(8)

The communication device according to any one of (1) to (7), further including a measurement signal transmitting section that performs beam-sweeping transmission of a measurement signal by using the beam group.

(9)

The communication device according to (8), in which the information regarding the identicalness includes information that sets a measurement result for a subset of a third beam group defined in a third frequency bandwidth and a measurement result for beams which belong to a fourth beam group defined in a fourth frequency bandwidth and of which directions are identical to those of beams belonging to another subset of the third beam group to be associated with each other and reported.

(10)

The communication device according to any one of (1) to (9), in which the setting section performs setting of uplink beam groups defined in a plurality of the frequency bandwidths, respectively, and the information regarding the identicalness includes information that instructs to perform beam-sweeping transmission of a measurement signal using a plurality of the uplink beam groups defined in a plurality of the frequency bandwidths, respectively.

(11)

The communication device according to any one of (1) to (10), in which the setting section performs setting of uplink beam groups defined in a plurality of the frequency bandwidths, respectively, and the information regarding the identicalness includes information that instructs not to perform beam-sweeping transmission of a measurement signal using the uplink beam group defined in a specific frequency bandwidth.

(12)

A communication device including:

a measurement reporting section that measures, on the basis of information regarding identicalness between beam groups defined in frequency bandwidths different from each other for beam groups defined in a plurality of the frequency bandwidths, respectively, a measurement signal that is beam-sweeping transmitted by another communication device by using the beam group, and reports a measurement result, the information being notified from the another communication device.

(13)

The communication device according to (12), in which the measurement reporting section reports a measurement result for a first beam group defined in a first frequency bandwidth as a measurement result for a second beam group defined in a second frequency bandwidth.

(14)

The communication device according to (13), in which the measurement reporting section reports a measurement result for a subset of the first beam group as a measurement result for the second beam group.

(15)

The communication device according to any one of (12) to (14), in which the measurement reporting section reports a measurement result for a subset of a third beam group defined in a third frequency bandwidth and a measurement result for beams which belong to a fourth beam group defined in a fourth frequency bandwidth and of which directions are identical to those of beams belonging to another subset of the third beam group, in association with each other.

(16)

The communication device according to any one of (12) to (15), in which uplink beam groups are defined in a plurality of the frequency bandwidths, respectively, and the measurement reporting section does not perform beam-sweeping transmission of a measurement signal using some of the uplink beam groups defined in a plurality of the frequency bandwidths, respectively, but performs beam-sweeping transmission of a measurement signal using another uplink beam group.

(17)

A communication method performed by a processor, the communication method including:

performing setting of beam groups defined in a plurality of frequency bandwidths, respectively; and notifying a terminal device of information regarding identicalness between the beam groups defined in the frequency bandwidths different from each other.

(18)

A communication method performed by a processor, the communication method including:

measuring, on the basis of information regarding identicalness between beam groups defined in frequency bandwidths different from each other for beam groups defined in a plurality of the frequency bandwidths, respectively, a measurement signal that is beam-sweeping transmitted by another communication device by using the beam group, and reporting a measurement result, the information being notified from the another communication device.

(19)

A recording medium in which a program for causing a computer to function as a setting section and a notification section is recorded, the setting section performing setting of beam groups defined in a plurality of frequency bandwidths, respectively, and the notification section notifying a terminal device of information regarding identicalness between the beam groups defined in the frequency bandwidths different from each other.

(20)

A recording medium in which a program for causing a computer to function as a measurement reporting section is recorded, the measurement reporting section measuring, on the basis of information regarding identicalness between beam groups defined in frequency bandwidths different from each other for beam groups defined in a plurality of the frequency bandwidths, respectively, a measurement signal that is beam-sweeping transmitted by another communication device by using the beam group, and reporting a measurement result, and the information being notified from the another communication device.

REFERENCE SIGNS LIST

1 System
11 Cell
20 Core network
30 PDN
40 Beam group
100 Base station
110 Antenna section
120 Wireless communication section
130 Network communication section
140 Storage section
150 Control section
151 Setting section
153 Notification section
155 Measurement signal transmitting section
157 Identicalness evaluation section
200 Terminal device
210 Antenna section
220 Wireless communication section
230 Storage section
240 Control section
241 Measurement reporting section
243 Measurement signal transmitting section

The invention claimed is:

1. A communication device configured to operate as a base station and comprising:
circuitry configured to:
create a first beam group in a first frequency bandwidth, and a second beam group in a second frequency bandwidth different from the first frequency bandwidth;
transmit beam group information to a terminal device,
wherein the beam group information indicates that a beam direction of at least one beam in the first beam group is identical to a beam direction of at least one beam in the second beam group; and
based on the beam group information indicating that the beam direction of at least one beam in the first beam group is identical to the beam direction of at least one beam in the second beam group, receive, from the terminal device, a measurement result of the at least one beam in the second beam group based on a measurement of the at least one beam in the first beam group by the terminal device.

2. The communication device according to claim 1, wherein the at least one beam in the second beam group comprises a range of beams in the second beam group, and
wherein the indication indicates that the terminal device is to report a measurement result of the range of beams in the second beam group based on the measurement of the at least one beam in the first beam group.

3. The communication device according to claim 1, wherein the first beam group includes a plurality of subsets, and wherein the at least one beam in the second beam group is included in the plurality of subsets of the second beam group, and
wherein the indication indicates that the terminal device is to report a measurement result of the plurality of subsets of the second beam group based on the measurement of the at least one beam in the first beam group.

4. The communication device according to claim 1, wherein the measurement result of the at least one beam in the second beam group is based on a beam-sweeping transmission of a first measurement signal from the base station via the first beam group followed by a beam-sweeping transmission of a second measurement signal from the base station via the second beam group.

5. The communication device according to claim 1, wherein the circuitry is further configured to set uplink beam groups defined in a plurality of the frequency bandwidths, respectively, and
wherein the beam group information includes information that instructs the terminal device to perform a beam-sweeping transmission of a measurement signal using a plurality of the uplink beam groups defined in a plurality of the frequency bandwidths, respectively.

6. The communication device according to claim 1, wherein the circuitry is further configured to set, uplink beam groups defined in a plurality of the frequency bandwidths, respectively, and
wherein the beam group information includes information that instructs the terminal device not to perform beam-sweeping transmission of a measurement signal using the uplink beam group defined in a specific frequency bandwidth.

7. A communication device configured to operate as a terminal device and comprising:
circuitry configured to:
receive beam group information from a base station,
wherein the beam group information indicates that a beam direction of at least one beam in the first beam group is identical to a beam direction of at least one beam in the second beam group, and
wherein the base station creates the first beam group in a first frequency bandwidth, and the second beam group in a second frequency bandwidth different from the first frequency bandwidth; and
based on the beam group information indicating that the beam direction of at least one beam in the first beam group is identical to the beam direction of at least one beam in the second beam group:
measure the at least one beam in the first beam group; and
transmit, to the base station, a measurement result of the at least one beam in the second beam group based on the measurement of the at least one beam in the first beam group.

8. The communication device according to claim 7, wherein the measurement result of the at least one beam in the second beam group is based on a beam-sweeping transmission of a first measurement signal from the base station via the first beam group followed by a beam-sweeping transmission of a second measurement signal from the base station via the second beam group.

9. A communication method performed by a processor in a device configured to operate as a base station, the communication method comprising:

setting a first beam group in a first frequency bandwidth, and a second beam group in a second frequency bandwidth different from the first frequency bandwidth; and transmitting beam group information to a terminal device, wherein the beam group information indicates that a beam direction of at least one beam in the first beam group is identical to a beam direction of at least one beam in the second beam group; and based on the beam group information indicating that the beam direction of at least one beam in the first beam group is identical to the beam direction of at least one beam in the second beam group, receiving, from the terminal device, a measurement result of the at least one beam in the second beam group based on a measurement of the at least one beam in the first beam group by the terminal device.

10. The communication method according to claim 9, wherein the measurement result of the at least one beam in the second beam group is based on a beam-sweeping transmission of a first measurement signal from the base station via the first beam group followed by a beam-sweeping transmission of a second measurement signal from the base station via the second beam group.

11. A communication method performed by a processor configured to operate as a terminal device, the communication method comprising:

receiving beam group information from a base station, wherein the beam group information indicates that a beam direction of at least one beam in the first beam group is identical to a beam direction of at least one beam in the second beam group, and wherein the base station creates the first beam group in a first frequency bandwidth, and the second beam group in a second frequency bandwidth different from the first frequency bandwidth; and based on the beam group information indicating that the beam direction of at, least one beam in the first beam group is identical to the beam direction of at least one beam in the second beam group:

measuring the at least one beam in the first beam group; and transmitting, to the base station, a measurement result of the at least one beam in the second beam group based on the measurement of the at least one beam in the first beam group.

12. The communication method according to claim 11, wherein the measurement result of the at least one beam in the second beam group is based on a beam-sweeping transmission of a first measurement signal from the base station via the first beam group followed by a beam-sweeping transmission of a second measurement signal from the base station via the second beam group.

13. A non-transitory recording medium in which a program for causing a computer to configured to operate as a base station to perform a method of communication, the method comprising:

setting a first beam group in a first frequency bandwidth, and a second beam group in a second frequency bandwidth different from the first frequency bandwidth; and transmitting beam group information to a terminal device, wherein the beam group information indicates that a beam direction of at least one beam in the first beam group is identical to a beam direction of at least one beam in the second beam group; and based on the beam group information indicating that the beam direction of at, least one beam in the first beam group is identical to the beam direction of at least one beam in the second beam group, receiving, from the terminal device, a measurement result of the at least one beam in the second beam group based on a measurement of the at least one beam in the first beam group by the terminal device.

14. The non-transitory recording medium according to claim 13, wherein the measurement result of the at least one beam in the second beam group is based on a beam-sweeping transmission of a first measurement signal from the base station via the first beam group followed by a beam-sweeping transmission of a second measurement signal from the base station via the second beam group.

15. A non-transitory recording medium in which a program for causing a computer configured to operate as a terminal device to perform a method of communication, the method comprising:

receiving beam group information from a base station, wherein the beam group information indicates that a beam direction of at least one beam in the first beam group is identical to a beam direction of at least one beam in the second beam group, and wherein the base station creates the first beam group in a first frequency bandwidth, and the second beam group in a second frequency bandwidth different from the first frequency bandwidth; and based on the beam group information indicating that the beam direction of at least one beam in the first beam group is identical to the beam direction of at least one beam in the second beam group:

measuring the at least one beam in the first beam group; and transmitting, to the base station, a measurement result of the at least one beam in the second beam group based on the measurement of the at least one beam in the first beam group.

16. The non-transitory recording medium according to claim 15, wherein the measurement result of the at least one beam in the second beam group is based on a beam-sweeping transmission of a first measurement signal from the base station via the first beam group followed by a beam-sweeping transmission of a second measurement signal from the base station via the second beam group.

* * * * *